US006919879B2

(12) United States Patent
Griffin et al.

(10) Patent No.: US 6,919,879 B2
(45) Date of Patent: *Jul. 19, 2005

(54) HAND-HELD ELECTRONIC DEVICE WITH A KEYBOARD OPTIMIZED FOR USE WITH THE THUMBS

(75) Inventors: Jason T. Griffin, Waterloo (CA); David M. Walters, Waterloo (CA); John A. Holmes, Waterloo (CA); Mihal Lazaridis, Waterloo (CA)

(73) Assignee: Research In Motion Limited, Waterloo (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 10/205,023

(22) Filed: Jul. 25, 2002

(65) Prior Publication Data

US 2003/0020692 A1 Jan. 30, 2003

Related U.S. Application Data

(63) Continuation-in-part of application No. 09/663,972, filed on Sep. 19, 2000, which is a continuation-in-part of application No. 09/106,585, filed on Jun. 29, 1998, now Pat. No. 6,278,442, which is a continuation-in-part of application No. 29/089,942, filed on Jun. 26, 1998, now Pat. No. Des. 416,256.
(60) Provisional application No. 60/307,755, filed on Jul. 25, 2001.

(51) Int. Cl.[7] ................................................ G09G 5/00
(52) U.S. Cl. ......................... 345/168; 341/20; 341/21; 341/22; 200/5 R; 200/302.1; 200/302.2; 400/486; 400/489
(58) Field of Search ......................... 345/156, 168–172, 345/184, 102; 341/20–22; 200/5 R, 302.1–302.2, 1 TK, 11 TW; 400/486, 489; D14/247, 252

(56) References Cited

U.S. PATENT DOCUMENTS

| 4,029,915 A | 6/1977 | Ojima |
| 4,449,839 A | 5/1984 | Bleuer |

(Continued)

FOREIGN PATENT DOCUMENTS

| EP | 0267801 | 5/1988 |
| EP | 0278169 | 8/1988 |

(Continued)

OTHER PUBLICATIONS

Anonymous: Triangular Toggle Keys for Touch–Tone Phones; IBM Technical Disclosure Bulletin, vol. 31, No. 1, Jun. 1, 1988, pp. 47–49, New York, US.

*Primary Examiner*—Henry N. Tran
(74) *Attorney, Agent, or Firm*—Jones Day; Krishna K. Pathiyal; Robert C. Liang

(57) ABSTRACT

A hand-held electronic device with a keyboard optimized for use with the thumbs is provided. The handheld device includes a keyboard, a display, and a processor. The keyboard is horizontally positioned symmetrically between a left edge and a right edge of a face of the hand-held messaging device. The keyboard has a plurality of keys arranged in a plurality of rows across the face, wherein each row of keys is arranged in a concave pattern. The display is vertically positioned between the keyboard and a top edge of the face and is horizontally positioned symmetrically between the left edge and the right edge of the face. The processor is coupled to the keyboard and the display, and controls the operation of the hand-held messaging device.

128 Claims, 14 Drawing Sheets

U.S. PATENT DOCUMENTS

| | | |
|---|---|---|
| D278,341 S | 4/1985 | Scheid |
| D293,241 S | 12/1987 | Wan et al. |
| D312,628 S | 12/1990 | Yokoi et al. |
| D313,401 S | 1/1991 | Tanabe |
| D313,413 S | 1/1991 | Langton |
| 5,059,048 A * | 10/1991 | Sirkin .................. 400/486 |
| 5,184,830 A | 2/1993 | Okada et al. |
| 5,217,295 A | 6/1993 | Tortola et al. |
| 5,288,158 A | 2/1994 | Matias |
| 5,336,001 A * | 8/1994 | Lichtenberg ............ 400/489 |
| 5,337,346 A | 8/1994 | Uchikura |
| 5,360,280 A * | 11/1994 | Camacho et al. ......... 400/489 |
| 5,367,298 A | 11/1994 | Axthelm |
| D357,253 S | 4/1995 | Wong |
| 5,410,141 A | 4/1995 | Koenck et al. |
| 5,410,333 A | 4/1995 | Conway |
| 5,426,449 A | 6/1995 | Danziger |
| D359,920 S | 7/1995 | Sakamoto |
| 5,436,954 A | 7/1995 | Nishiyama et al. |
| 5,457,454 A | 10/1995 | Sugano |
| D367,043 S | 2/1996 | Ross et al. |
| 5,500,643 A * | 3/1996 | Grant ..................... 341/22 |
| 5,543,787 A | 8/1996 | Karidis et al. |
| 5,563,631 A | 10/1996 | Masunaga |
| 5,575,576 A | 11/1996 | Roysden, Jr. |
| 5,600,790 A | 2/1997 | Barnstijn et al. |
| 5,606,712 A | 2/1997 | Hidaka |
| 5,611,031 A | 3/1997 | Hertzfeld et al. |
| D381,021 S * | 7/1997 | Williams et al. |
| 5,659,307 A | 8/1997 | Karidis et al. |
| 5,661,605 A | 8/1997 | Conway |
| D383,756 S | 9/1997 | Henderson et al. |
| 5,672,108 A | 9/1997 | Lam et al. |
| D386,497 S * | 11/1997 | Huslig et al. ............ D14/191 |
| 5,689,253 A * | 11/1997 | Hargreaves et al. ......... 341/22 |
| D390,509 S | 2/1998 | Antzinas et al. |
| 5,737,394 A | 4/1998 | Anderson et al. |
| 5,786,776 A | 7/1998 | Kisaichi et al. |
| D397,369 S | 8/1998 | Rissman |
| D397,728 S | 9/1998 | Yuen et al. |
| D399,537 S | 10/1998 | Chi et al. |
| 5,818,437 A | 10/1998 | Grover et al. |
| 5,825,353 A | 10/1998 | Will |
| 5,827,082 A | 10/1998 | Laine |
| D402,572 S | 12/1998 | Han |
| D403,362 S | 12/1998 | Fai |
| 5,861,821 A | 1/1999 | Kato et al. |
| 5,893,798 A | 4/1999 | Stambolic et al. |
| 5,915,228 A | 6/1999 | Kunihiro et al. |
| 5,920,308 A | 7/1999 | Kim |
| 5,931,873 A | 8/1999 | Cisar |
| 5,963,197 A | 10/1999 | Bacon et al. |
| 5,974,238 A | 10/1999 | Chase, Jr. |
| D416,256 S | 11/1999 | Griffin et al. |
| 5,982,520 A | 11/1999 | Weiser et al. |
| 5,995,026 A | 11/1999 | Sellers |
| 6,005,496 A | 12/1999 | Hargreaves et al. |
| 6,006,351 A | 12/1999 | Peretz et al. |
| 6,009,333 A | 12/1999 | Chaco |
| 6,014,429 A | 1/2000 | LaPorta et al. |
| 6,014,573 A | 1/2000 | Lehtonen et al. |
| D420,351 S | 2/2000 | Waldner |
| 6,023,779 A | 2/2000 | Fullam et al. |
| 6,047,047 A | 4/2000 | Aldridge et al. |
| 6,047,196 A | 4/2000 | Makela et al. |
| 6,049,796 A | 4/2000 | Siitonen et al. |
| 6,052,070 A | 4/2000 | Kivela et al. |
| 6,084,576 A * | 7/2000 | Leu et al. ................. 345/168 |
| 6,091,956 A | 7/2000 | Hollenberg |
| 6,094,197 A | 7/2000 | Buxton et al. |
| 6,102,594 A | 8/2000 | Strom |
| 6,103,979 A | 8/2000 | Motoyama et al. |
| 6,107,997 A | 8/2000 | Ure |
| D432,511 S | 10/2000 | Eckholm |
| D433,017 S | 10/2000 | Martinez |
| D433,460 S | 11/2000 | Griffin et al. |
| 6,148,261 A | 11/2000 | Obradovich et al. |
| 6,157,323 A | 12/2000 | Tso et al. |
| D436,591 S | 1/2001 | Abston et al. |
| 6,212,412 B1 | 4/2001 | Rogers et al. |
| D441,733 S | 5/2001 | Do et al. |
| 6,243,789 B1 | 6/2001 | Hasbun et al. |
| 6,278,442 B1 | 8/2001 | Griffin et al. |
| 6,295,052 B1 | 9/2001 | Kato et al. |
| 6,297,795 B1 | 10/2001 | Kato et al. |
| 6,304,261 B1 | 10/2001 | Shields et al. |
| 6,304,431 B1 | 10/2001 | Kim |
| 6,310,609 B1 * | 10/2001 | Morgenthaler ............... 345/170 |
| D451,079 S | 11/2001 | Ali |
| D454,349 S | 3/2002 | Makidera et al. |
| D454,849 S | 3/2002 | Eckholm |
| 6,356,258 B1 | 3/2002 | Kato et al. |
| 6,374,277 B2 | 4/2002 | Vong et al. |
| D456,794 S | 5/2002 | Laverick et al. |
| 6,385,463 B1 | 5/2002 | Lieberman et al. |
| 6,396,482 B1 | 5/2002 | Griffin et al. |
| D458,239 S | 6/2002 | Shim et al. |
| D459,327 S | 6/2002 | Ali |
| D460,068 S | 7/2002 | Lanzaro et al. |
| D460,493 S | 7/2002 | Griffin et al. |
| D461,803 S | 8/2002 | Griffin et al. |
| 6,452,588 B2 | 9/2002 | Griffin et al. |
| D464,995 S | 10/2002 | Griffin et al. |
| 6,459,968 B1 | 10/2002 | Kochie |
| 6,489,950 B1 | 12/2002 | Griffin et al. |
| 6,507,336 B1 | 1/2003 | Lunsford |
| D472,225 S | 3/2003 | Griffin |
| 6,535,749 B1 | 3/2003 | Iwata et al. |
| 6,538,651 B1 | 3/2003 | Haymann et al. |
| D472,551 S | 4/2003 | Griffin |
| D473,226 S | 4/2003 | Griffin |
| D476,985 S | 7/2003 | Griffin |
| D478,585 S | 8/2003 | Griffin |
| 6,611,254 B1 | 8/2003 | Griffin et al. |
| D479,233 S | 9/2003 | Griffin |
| D480,722 S | 10/2003 | Griffin |
| 6,630,924 B1 | 10/2003 | Peck |
| 6,647,367 B2 | 11/2003 | McArthur et al. |
| 2001/0044828 A1 | 11/2001 | Kikinis |

FOREIGN PATENT DOCUMENTS

| | | |
|---|---|---|
| EP | 0538020 | 4/1993 |
| EP | 0685801 | 12/1995 |
| EP | 0732646 | 9/1996 |
| EP | 0760291 | 3/1997 |
| EP | 1143327 | 10/2001 |
| WO | 9833111 | 7/1998 |
| WO | 9937025 | 7/1999 |
| WO | 0030381 | 5/2000 |
| WO | 0038041 | 6/2000 |
| WO | 0074240 | 12/2000 |
| WO | 0150335 | 7/2001 |

* cited by examiner

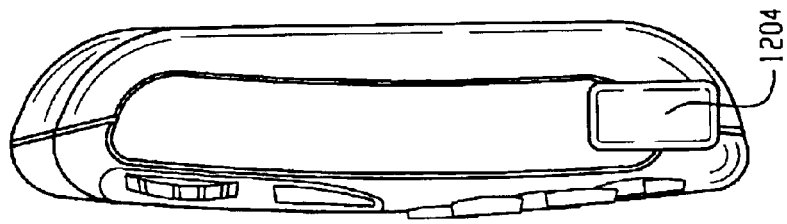
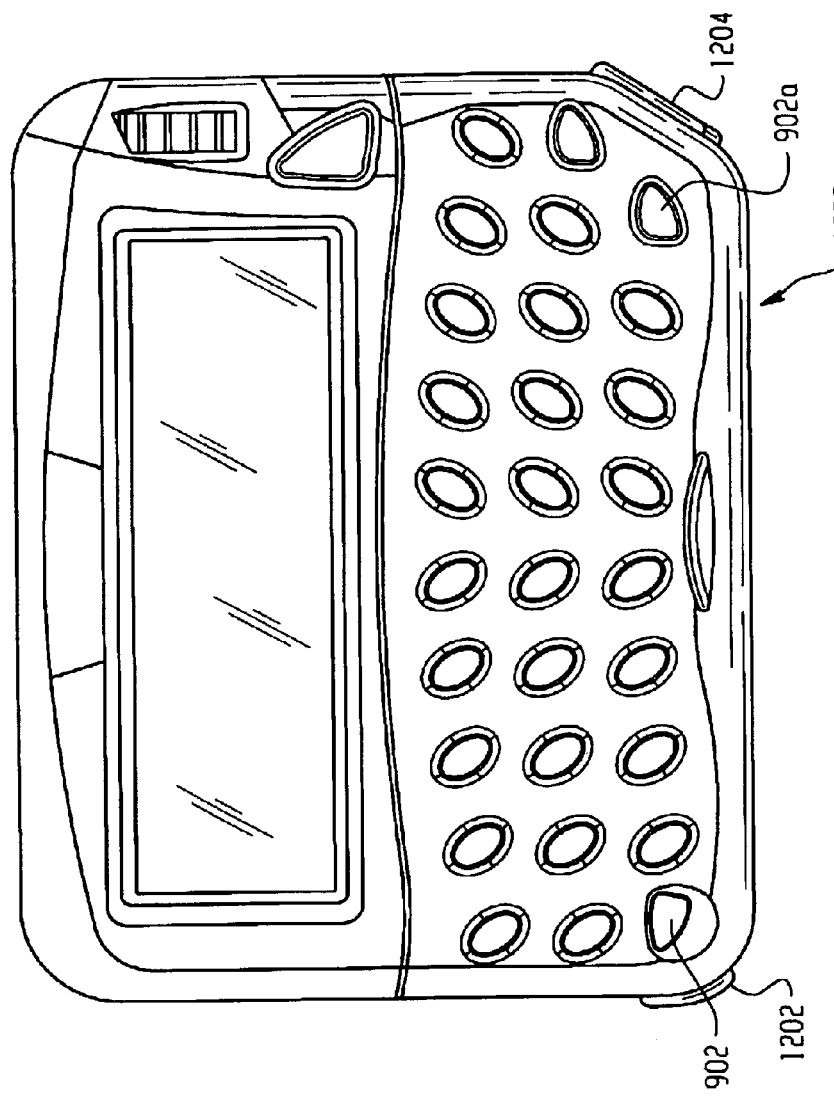
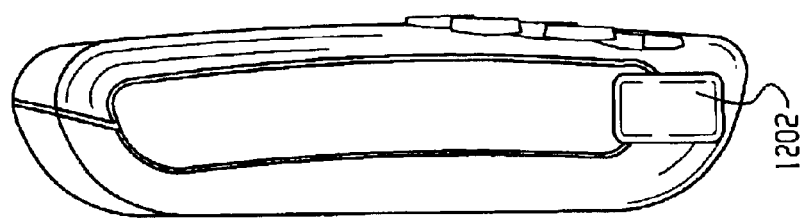
Fig. 12c
Fig. 12a
Fig. 12b

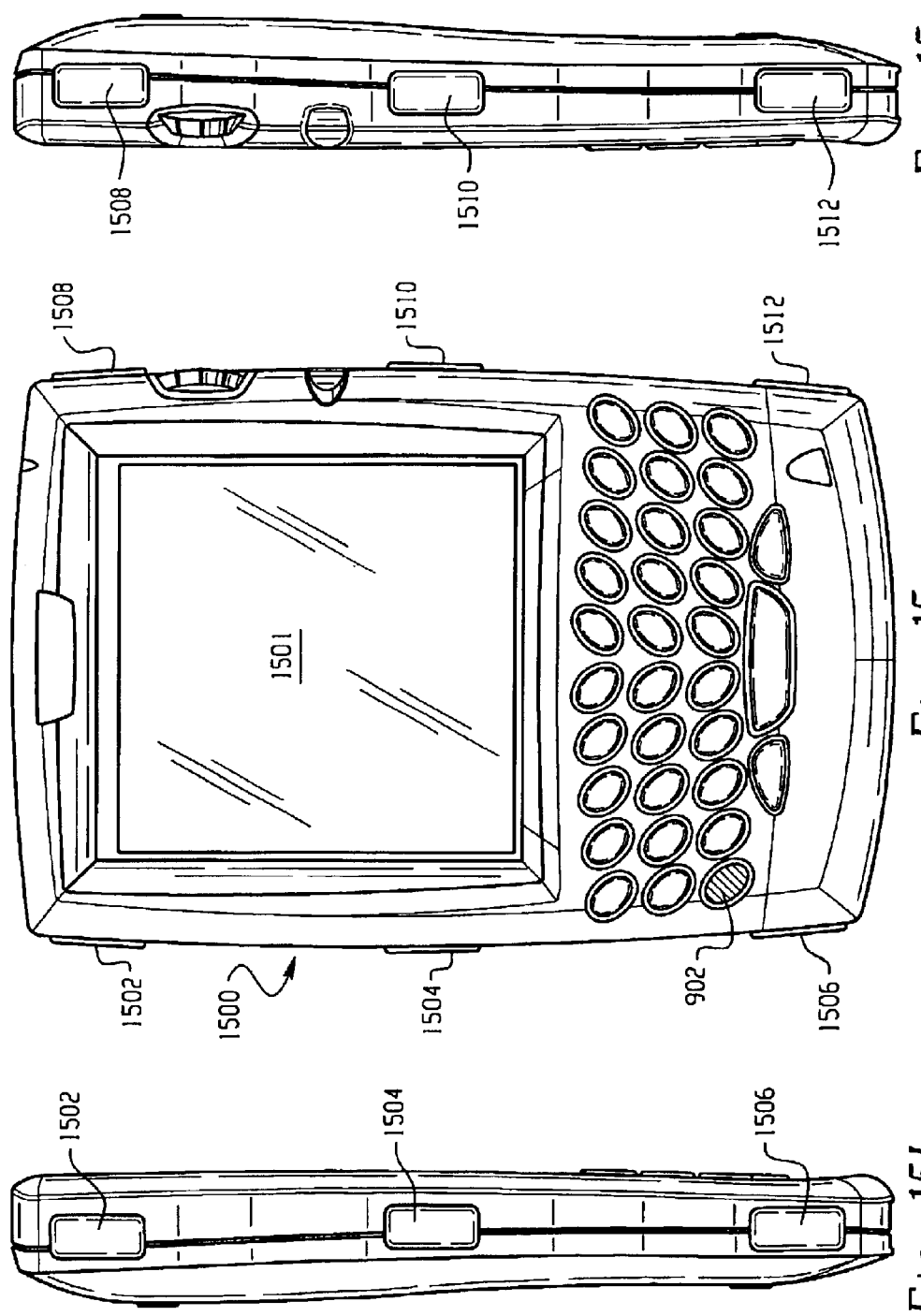

HAND-HELD ELECTRONIC DEVICE WITH A KEYBOARD OPTIMIZED FOR USE WITH THE THUMBS

CROSS-REFERENCE TO RELATED APPLICATION

This application claims priority from and is related to the following prior application: "Hand-Held Electronic Device with a Keyboard Optimized for Use with the Thumbs", U.S. Provisional Application Ser. No. 60/307,755, filed on Jul. 25, 2001. In addition, this application is a continuation-in-part of U.S. patent application Ser. No. 09/663,972, filed on Sep. 19, 2000, which is a continuation-in-part of U.S. patent application Ser. No. 09/106,585, filed on Jun. 29, 1998 (now U.S. Pat. No. 6,278,442), which is a continuation-in-part of U.S. Design application Ser. No. 29/089,942, entitled "Hand-held Messaging Device with Keyboard", filed on Jun. 26, 1998 (now U.S. Pat. No. Des. 416,256) and assigned to the assignee of the present invention. These prior applications, including the entire written descriptions and drawing figures, are hereby incorporated into the present application by reference.

BACKGROUND

The arrangements described herein are directed toward the field of small, hand-held electronic devices such as personal data assistants (PDAs), personal information managers (PIMs), two-way pagers and the like. In particular, the described systems and methods provide the user of a hand-held device with the ability to input data with a minimal amount of key strokes, and includes a keyboard structure that is optimized for use substantially with the thumbs.

In a two-way paging system that provides two-way, full text messaging, there is a need to permit the user to initiate messages and to respond to messages in a timely fashion and with text entirely created by the user on a communication device. In order to keep the form factor of the device small enough to be worn on the body of the user, such as with a belt clip, the input device should be small, have a minimal number of keys, and be optimized for use with a minimal number of key strokes. Known systems have attempted to address these needs by incorporating virtual keyboards or pen-based systems for user inputs to the device, but such systems require the user to input data in an unfamiliar manner. Additionally, in a small hand-held messaging device, such as a two-way pager, these systems prove awkward to use.

In order to provide a hand-held electronic device that permits a user the opportunity to enter data into an address book, a calendar, a task list, an email or other message or a similar text file that requires user-generated data, this application describes an input device that is oriented to be operated substantially through use of the thumbs. This is accomplished first by providing a keyboard with a minimal number of keys, but with the keys representing the alphabet generally placed in the same order as they would appear on a standard keyboard, such as in a standard QWERTY or a DVORAK keyboard layout. The use of a keyboard layout that is familiar to the user enables the user to immediately use the device without having to hunt for the keys he or she wishes to use.

Although the layout is similar to a standard keyboard, the keys are placed at an orientation and in a particular shape that attempts to maximize the surface area of the thumb hitting the key and to provide the user with a comfortable position of the hands for data input. Also, the orientation encourages input by the thumbs, which the inventors of the present invention have discovered to be faster and more accurate in small hand-held electronic devices than touch-typing or "hunting and pecking" typing.

The device preferably includes an additional input means for control of functions that might otherwise be controlled by a keyboard that included function keys. To encourage data entry using thumbs and again to minimize the number of keys on the keyboard, the device may also include a thumb-wheel for control of menus to select forms and functions relevant to data input. The thumb-based wheel is preferably position in close proximity to the keyboard to enable the easy transition from thumb-based typing to thumb control of forms and functions via the thumb-wheel.

In addition to hardware features that encourage optimal data entry through the use of thumbs, several software features that are designed to minimize keystrokes and aid data entry are also provided.

SUMMARY

A hand-held electronic device with a keyboard optimized for use with the thumbs is provided. The hand-held device includes a keyboard, a display, and a processor. The keyboard is horizontally positioned symmetrically between a left edge and a right edge of a face of the hand-held messaging device. The keyboard has a plurality of keys arranged in a plurality of rows across the face, wherein each row of keys is arranged in a concave pattern. The display is vertically positioned between the keyboard and a top edge of the face and is horizontally positioned symmetrically between the left edge and the right edge of the face. The processor is coupled to the keyboard and the display, and controls the operation of the hand-held messaging device.

BRIEF DESCRIPTION OF THE DRAWINGS

FIGS. 12a through 12c are diagrams showing front and side views of a hand-held electronic device incorporating another alternative functional key arrangement;

FIGS. 15a through 15c show front and side views of another exemplary hand-held electronic device incorporating an alternative functional key arrangement;

DETAILED DESCRIPTION

Figure 1:
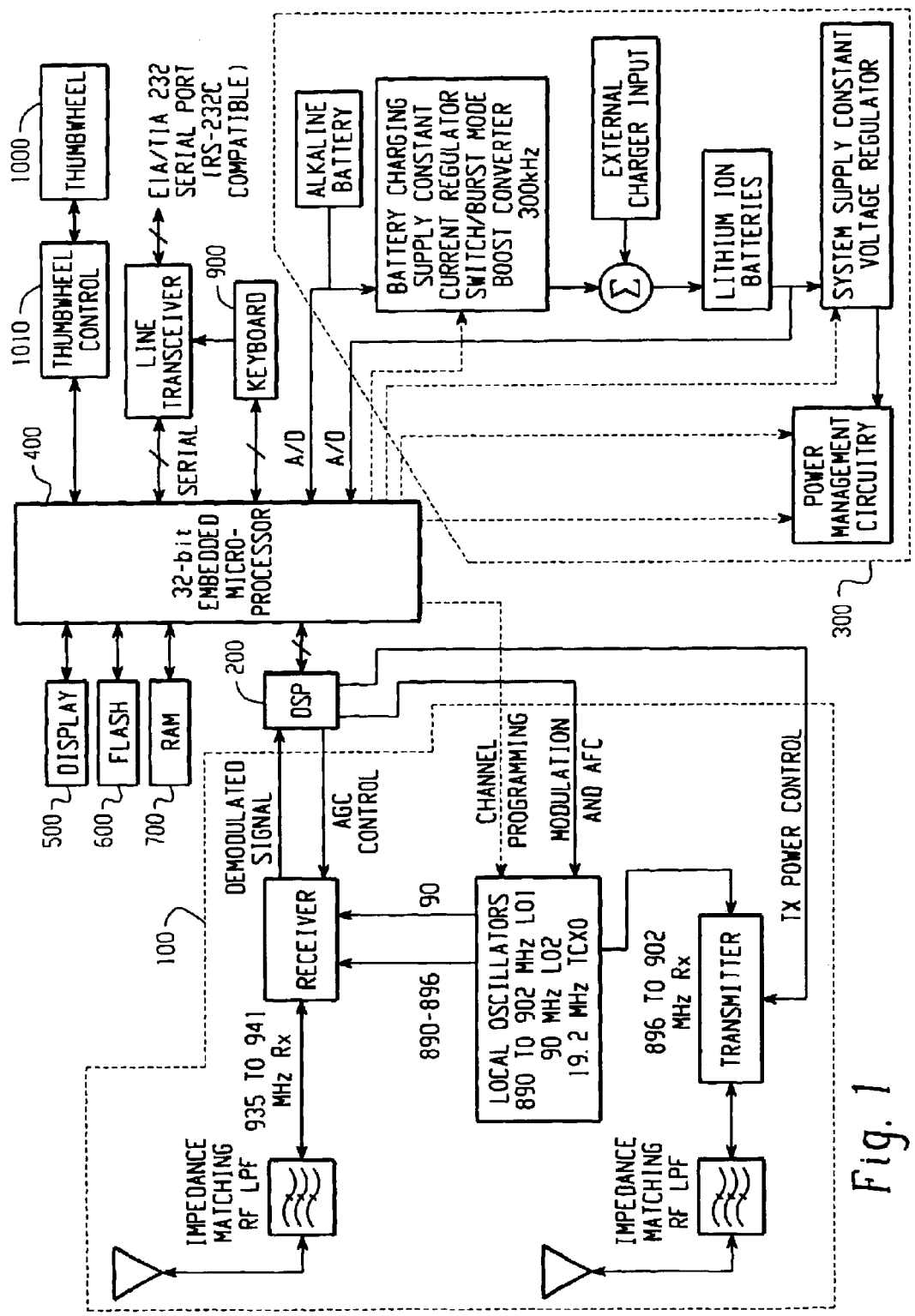
FIG. 1 is a block diagram of the major subsystems and elements comprising a palm-sized, mobile, two-way messaging device that may incorporate a keyboard optimized for use with the thumbs.

Referring now to the drawings, FIG. 1 is a block diagram of the major subsystems and elements comprising a palm-sized, mobile, two-way messaging device that may incorporate a keyboard optimized for use with the thumbs. The exemplary messaging device shown in FIG. 1 includes a wireless radio transmitter/receiver subsystem 100 connected to a DSP 200 for digital signal processing of the incoming and outgoing data transmissions, power supply and management subsystem 300, which supplies and manages power to the overall messaging device components, microprocessor 400, which is preferably an X86 architecture processor, which controls the operation of the messaging device, display 500, which is preferably a full graphic LCD, FLASH memory 600, RAM 700, serial port 800, keyboard 900, thumb-wheel 1000 and thumb-wheel control logic 1010.

In its intended use, a message comes to the device via a wireless data communications network, such as the Mobitex™ network, into subsystem 100, where it is demodulated via DSP 200, decoded and presented to microprocessor 300 for display on display 500. To access the display of the message, the user may choose from functions listed under a menu presented as a result of user interaction with thumb-wheel 1000. If the message is an email message, then the user may choose to respond to the email by selecting "Reply" from a menu presented on the display through interaction via thumb-wheel 1000 or via menu selection from keyboard 900. In typing the reply, the user can use keyboard 900 to type full text message replies, or insert pre-determined or "canned" responses by using either a particular keystroke pattern or through pulling down pre-determined text strings from a menu of items presented on display 500 through the use of thumb-wheel 1000.

When the reply to the message is composed, the user can initiate the sending of the message preferably by interaction through thumb-wheel 1000, or alternatively, with less efficiency, through a combination of keyboard 900 keystrokes. When the microprocessor 300 receives an indication that the message is to be sent, it processes the message for transport, and by directing and communicating with transmitter/receiver subsystem 100, enables the reply message to be sent via the wireless data communications network to the intended recipient. Similar interaction through I/O devices keyboard 900 and thumb-wheel 1000 can be used to initiate full-text messages or to forward messages to another party.

In addition, the keyboard 900 and thumb-wheel 1000 can be used to permit data entry to an address book resident on the messaging device, or an electronic calendar or log book, or any other function on the messaging device requiring data entry. Preferably, the thumb-wheel is a thumb-wheel with a push button SPST switch with quadrature signal outputs, such as that manufactured by Matsushita Electronic Components Co. Ltd. as part number EVQWK2001, but may, alternatively, be some other type of auxiliary input device.

Figure 2:
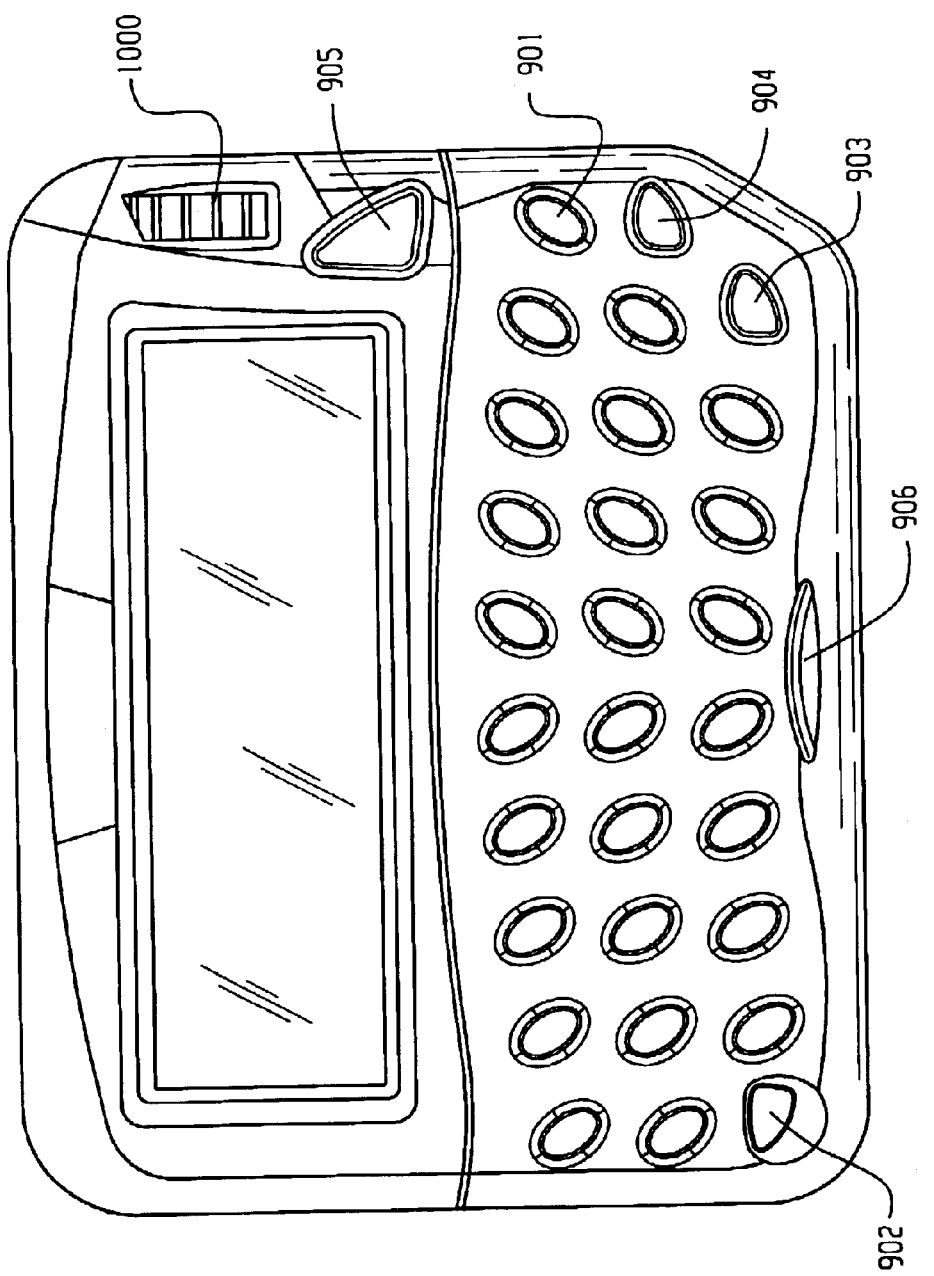
FIG. 2 is a front view of an exemplary messaging device having a keyboard that is optimized for use with the thumbs.

FIG. 2 is a front view of an exemplary messaging device having a keyboard that is optimized for use with the thumbs. Shown in FIG. 2 are a plurality of letter keys 901, specialized keys 902, 903, 904 and 905, and a space bar 906. Also shown is the thumb-wheel 1000 in its vertical orientation and in association with display 500 and keyboard 900. The specialized key 902 may, for example, be an alt key, the specialized key 903 may be a shift or capitalization key, the specialized key 904 may be a line feed key, and the specialized key 905 may be a backspace key. It should be understood, however, that the specialized keys 902–905 may provide other functions, such as an escape key, a delete key, a home key, a menu key, a cursor-left key or a cursor-right key. It should also be understood, that the messaging device may include additional functional keys. In addition, in alternative embodiments described below, certain functional keys, such as an alt key and shift/cap key, may be positioned on another device surface in addition to or instead of on the face of the device, to be operated, for example, by the fingers or part of the hand of a user.

FIG. 2 also shows the arrangement of keys on the keyboard into multiple rows. Each of the rows are arranged in a concave pattern, such as an arc. In the illustrated embodiment, the rows of keys are arranged along an arc in a concave-down pattern. In other embodiments, however, the rows of keys may be arranged in other concave patterns. For example, the concave pattern may be defined along two intersecting line segments instead of along an arc, and may be a concave-up pattern instead of a concave-down pattern. Such an arrangement of the keys not only facilitates thumb typing by a user but also reduces the space occupied by the keyboard. The concave rows of keys shown in FIG. 2 allow for location of the space bar 906 in its conventional keyboard position but reduce the amount of unoccupied space at the ends of the space bar.

Although FIG. 2 shows a preferred embodiment of a messaging device, other implementations incorporating alternate device architectures are also contemplated. For example, different patterns of the concave rows could be employed to accommodate keys on the keyboard between rows either in addition to or instead of only at the bottom of the keyboard in the position of the space bar shown in FIG. 2. In addition, many different shapes and orientations of the keys could also be utilized, as is further detailed below with respect to FIGS. 5–10. Similar keyboard layouts would also be suitable for use in other electronic devices with different display arrangements. Electronic devices having clamshell type designs in which the display is positioned on a movable cover portion of the device which is attached to the keyboard portion with a hinge, represent one such alternate keyboard/display arrangement. It is well within the scope of the present invention to include the inventive keyboard on a variety of handheld electronic devices such handheld electronic arcade devices; two-way pagers; wireless data communication devices; cell phones; and Personal Digital Assistants (PDAs).

In one alternative embodiment, the messaging device may include a light source, such as a backlight, that can be activated by a user of the device to light the keyboard and/or the display in low-light conditions.

Figure 3:
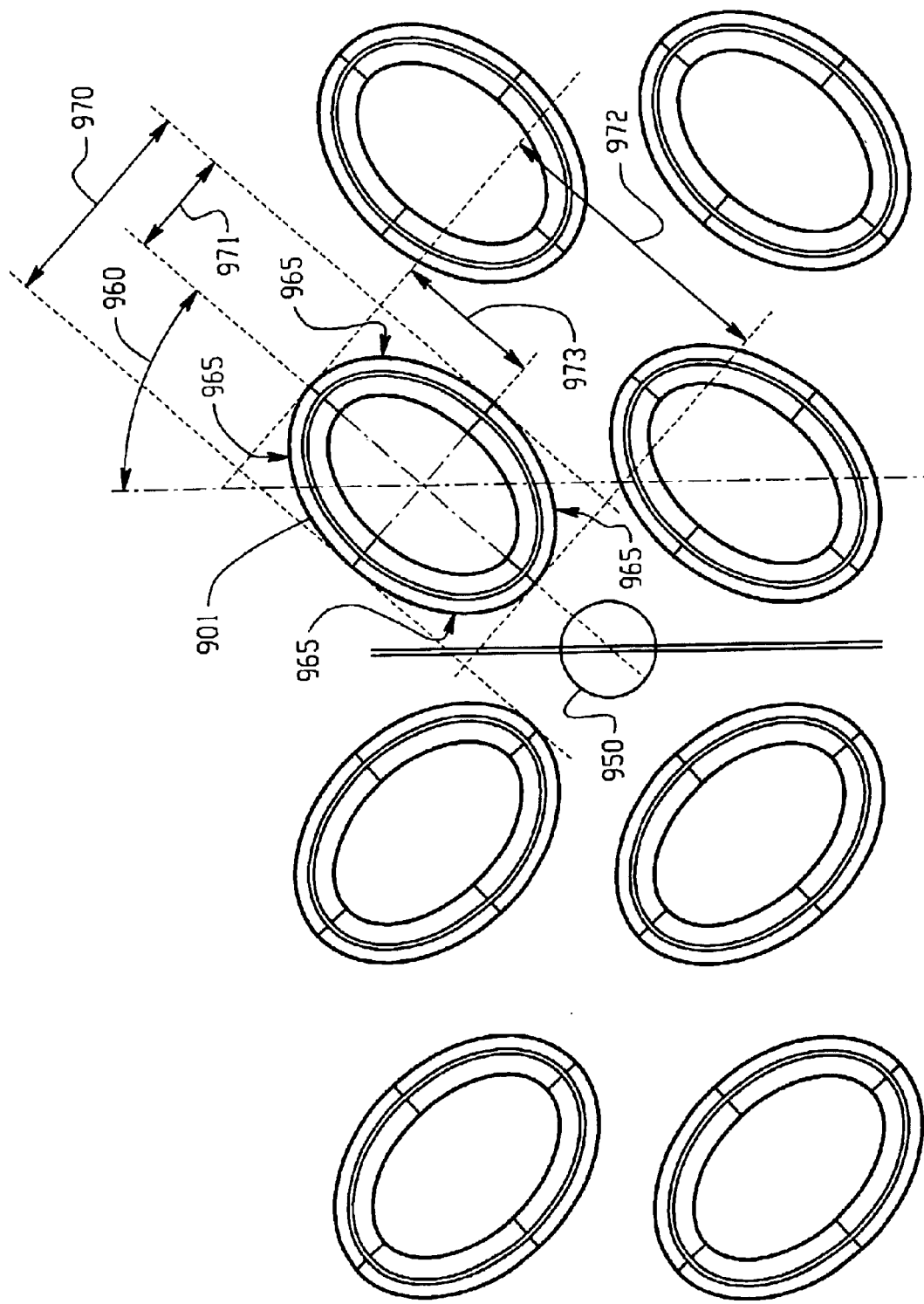
FIG. 3 is a view of a subset of the letter keys shown in FIG. 2, illustrating exemplary dimensions and relative positions of the keys.

FIG. 3 is a view of a subset of the letter keys 901 shown in FIG. 2, illustrating exemplary dimensions and relative positions of the keys. Also shown is the point 950 that marks the center of keyboard 900, key dimensions 970, 971, 972 and 973, as well as angle 960 and the rho value 965, representing curvature of a letter key 901. In investigating optimal key placement on the keyboard, it was determined that the keys should be placed at an angle 960 relative to a vertical reference bisecting the key that facilitated easy typing using thumbs. That angle is preferably positive 40 degrees relative to the vertical reference for keys on the right side of the keyboard (where 950 is the center of the keyboard), and negative 40 degrees for the keys on the left side of the keyboard. Complementary angles ranging from 20 degrees to 70 degrees could also be used to accomplish the goal, albeit less optimally, of facilitating thumb typing.

It should be understood, however, that alternative key dimensions and/or placements could also be utilized. For instance, the keys on the right and left sides of the keyboard could be tilted at the same angle 960 from vertical (i.e., all of the keys may have a positive angle 960 or all of the keys may have a negative angle 960), or could all be aligned with the vertical reference (i.e., having no angle 960 from vertical). It should also be understood that the phase "tilted at the same angle" as used within this application means either tilted at equal angles or tilted at nearly equal angles.

As is also shown on FIGS. 2 and 3, the keys 901 are dispersed across keyboard 900 evenly so that there is sufficient space between the keys to decrease the opportunity for multiple keys being depressed while thumb typing. Additionally, the keys 901 are sized appropriately given the footprint of the messaging device and the keyboard 900. In one embodiment, the messaging device measures 64 mm by 89 mm across its face, which does not leave much room for keyboard 900 and display 500. In this embodiment, keyboard 900 occupies over half of the face of the messaging device.

In order to maximize the surface area of the key that a thumb would hit, the keys are preferably oval, and have a rho 965 defining the curvature of the key of 0.414, although values may range higher or lower. Other rho values will lead to an acceptable, but not as optimal, or aesthetically pleasing, shape of keys 901. As to the key dimensions, the width 970 of the key 901 is 4.8 millimeters (971 representing the radius of half that value, 2.4 mm) and the length (or height) 972 of the key 901 is 7 millimeters (973 representing the radius of half that value, 3.5 mm). It should be understood, however, that other key shapes could also be utilized, such as the key shapes illustrated in FIGS. 8–10.

One of the software features that aids in the device being optimally used for thumb typing is a capitalization feature. Using this feature, if a user depresses a key 901, then the operating system detects a key down event. If the key is released after a period of time, the operating system detects a key up event. If, upon a key down event, a period of time elapses before a key up event is detected, then the operating system determines that a key repeat event has occurred representing a situation where a user has continued to depress a key without releasing it. A key repeat event is then treated by application software residing in either FLASH 600 or RAM 700 as an event that requires the capitalization of the key previously depressed. This feature disables a key repeat feature and substitutes instead a capitalization feature based upon a key repeat. The timing of the key scanning to determine whether a key has been released can be set to permit a slower keyboard response or a faster keyboard response, depending upon user experience or preferences. Depression of a letter key while or immediately after the shift/cap key 903 is depressed may also cause the upper case letter to be entered.

Although the capitalization function preferably works only to change the state of a letter to a capital, it alternatively could operate to change a capital letter to a lower case letter. The actual display is changed by the application program substituting the value of the capital letter in the register that holds the value of the letter to be displayed. As alternatively implemented, the continued depressing without release of a letter key could result in a key oscillating between upper case and lower case, depending on the length of time the key is depressed.

Figure 4:
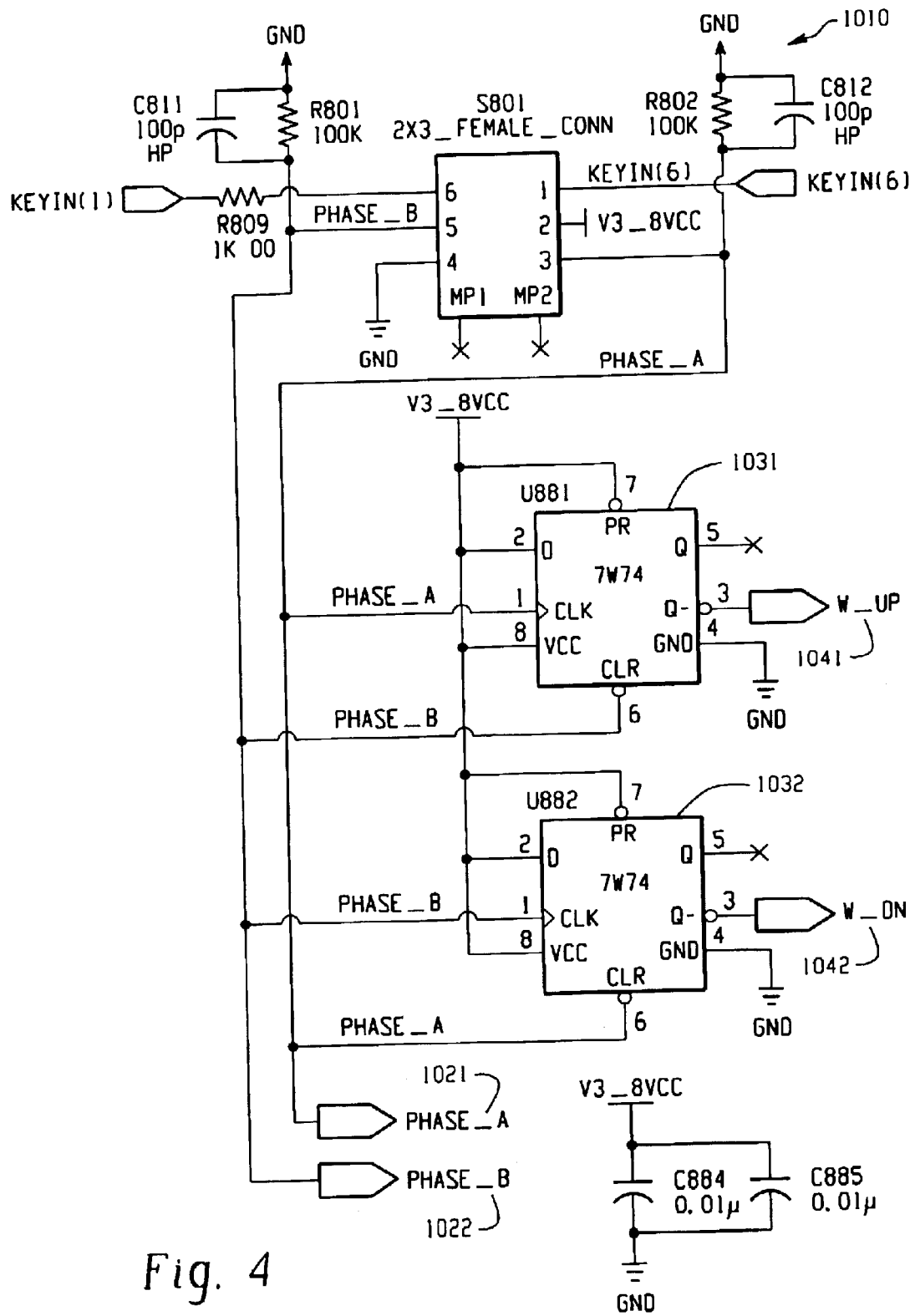
FIG. 4 is the logic circuitry associated with the thumb-wheel of FIGS. 1 and 2.

FIG. 4 is the logic circuitry 1010 associated with the thumb-wheel 1000 of FIGS. 1 and 2. Thumb-wheel 1000 outputs quadrature signals phase A 1021 and phase B 1022, which are processed by D flip-flops 1031 and 1032 to present signals 1041 W_UP and 1042 W_DN to microprocessor 300. Signals 1041 and 1042 represent, respectively, a user rolling the thumb-wheel up and rolling the thumb-wheel down.

Figure 5:
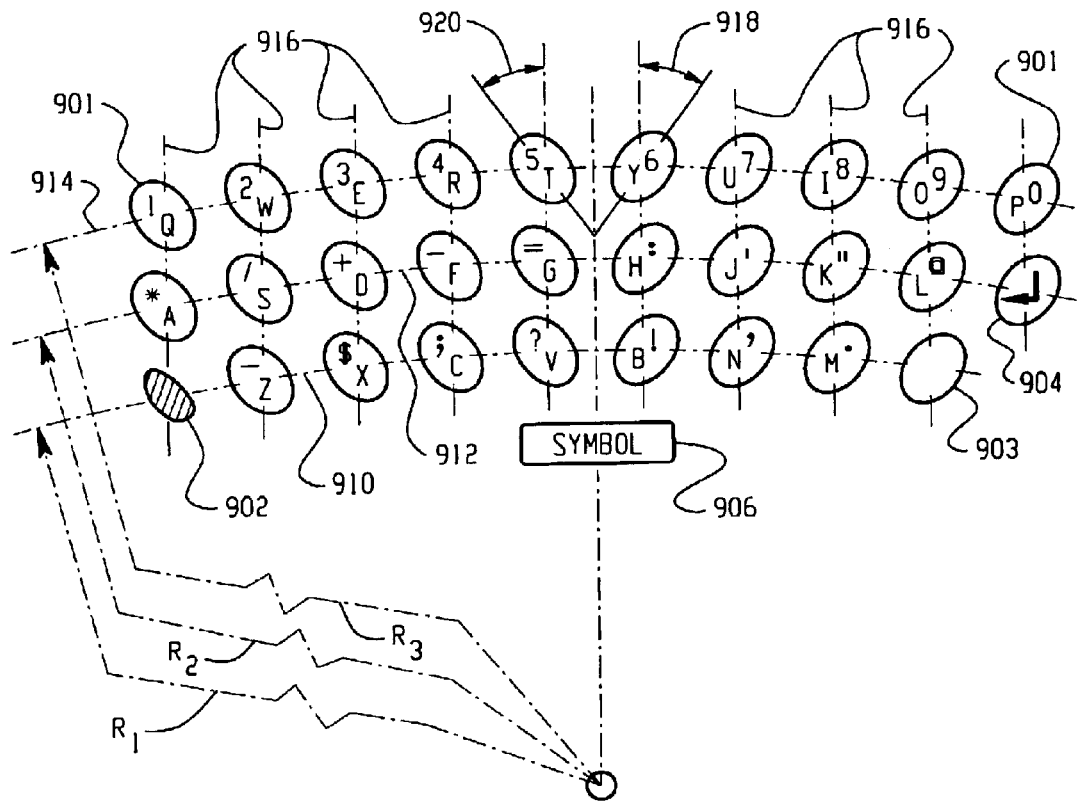
FIG. 5 is a diagram showing one exemplary embodiment of a keyboard that is optimized for use with the thumbs.

FIG. 5 is a diagram showing one exemplary embodiment of a keyboard that is optimized for use with the thumbs. This keyboard includes a plurality of letter keys 901 (A–Z), several function keys 902, 903, 904, and a spacebar/symbol selector 906. The respective keys 901 are preferably organized into three concave rows 910, 912, 914. The first concave row 910 includes the function keys 902, 903, and the letter keys 901 Z, X, C, V, B, N, and M, just like on the first row of a standard QWERTY keyboard. The degree of arcing of the first concave row 910 is preferably defined by a first radius R1. The second concave row 912 includes the function key 904, and the letter keys 901 A, S, D, F, G, H, J, K and L, just like on the second row of a standard QWERTY keyboard. The degree of arcing of the second concave row 912 is preferably defined by a second radius R2. The third concave row 914 includes the letter keys 901 Q, W, E, R, T, Y, U, I, O and P, just like on the third row of a standard QWERTY keyboard. The degree of arcing of the third concave row 914 is preferably defined by a third radius R3.

For the three-row organization shown in FIG. 5, the first radius R1 of the first concave row 910 is preferably less than the second radius R2 of the second concave row 912, which is preferably less than the third radius R3 of the third concave row 914. These radii R1, R2, R3 may define a set of concentric circles on which the concave rows of keys 910, 912, 914 are placed. Other configurations and orientations of the concave rows of keys are also possible.

Also shown in FIG. 5 are a set of vertical references 916. Each of these vertical references 916 bisects one or more (up to three) of the letter keys 901 making up the keyboard. In the embodiment shown in FIG. 5, the keys 901 are oval-shaped, and are oriented at an angle with respect to the vertical references 916. The keys on the right-hand side of the keyboard are oriented at a first predetermined angle 918, and the keys on the left-hand side of the keyboard are oriented at a second predetermined angle 920. The first predetermined angle 918 is a positive angle with respect to the vertical reference 916, and the second predetermined angle 920 is a negative angle with respect to the vertical reference 916. These first and second predetermined angles 918, 920 are complementary angles, for example +/−40 degrees from vertical. As discussed above, the keys may also be aligned at other angles, all tilted at the same angle, or aligned with the vertical reference.

The keys 901 in FIG. 5 are also preferably aligned along the set of vertical references 916, such that a key in the first row is aligned with a key in the second row, which is aligned with a key in the third row. For example, the N key in the first row 910 is aligned with the J key in the second row 912 and the U key in the third row 914. That is, a vertical line 916 drawn through the center of any of the keys 901 in the rows of keys perpendicular to the top and bottom edges of the device will intersect the center of a key in an adjacent row of keys.

Figure 6:
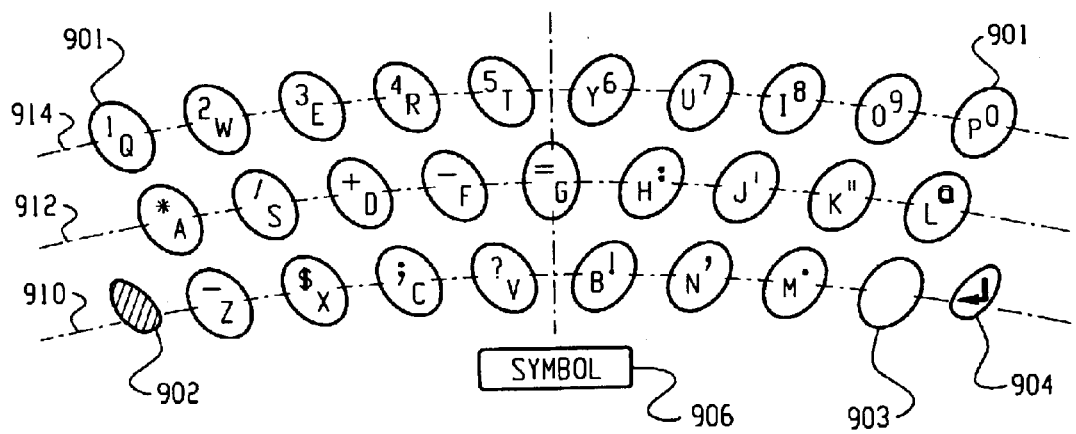
FIG. 6 is a diagram showing another exemplary embodiment of a keyboard optimized for use with the thumbs.
Figure 7:
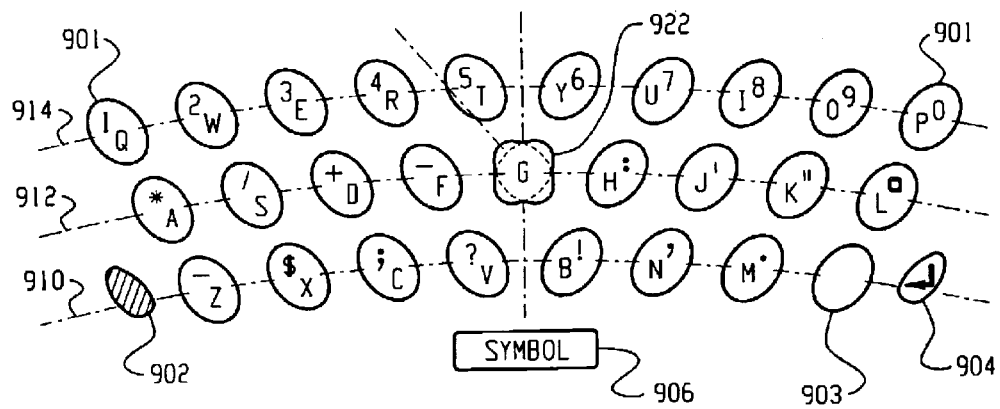
FIG. 7 is another embodiment of the keyboard shown in FIG. 6 having a special center key with a vertically symmetrical key shape and orientation.

FIG. 6 is a diagram showing another exemplary embodiment of a keyboard optimized for use with the thumbs. This embodiment is similar to FIG. 5, except that the keys 901 in each concave row 910, 912, 914 are not aligned along the set of vertical references 916, but instead are offset from one row to the next. Keys positioned along a vertical line passing through the center of the keyboard, such as the "G" key in FIG. 6 may be oriented such that an axis of symmetry of the shape coincides with the vertical line passing through the center of the keyboard, thereby allowing the key to be used as easily with the left as the right thumb. In the figure, although the "G" key was oriented with the major axis coinciding with a vertical, it could have been placed with the minor axis coinciding with the vertical. In another embodiment as shown in FIG. 7, a special center key 922 has a vertically symmetrical key shape and orientation that is a combination of the left key shape and the right key shape: by superimposing the two shapes and tracing the exterior circumference as a central shape, the resulting shape can be used just as easily with the left or right thumb.

Figure 8:
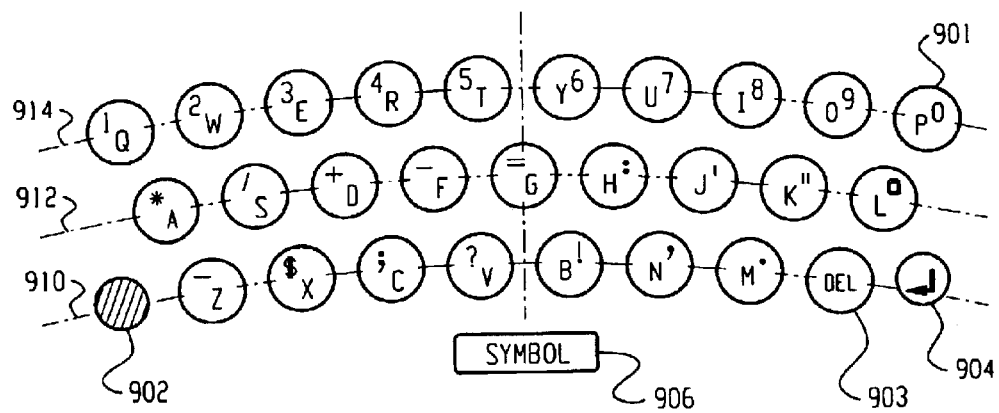
FIG. 8 shows a keyboard embodiment with circular keys.

FIG. 8 shows a keyboard embodiment with circular keys. This embodiment is similar to FIGS. 6 and 7, except that the keys 901 in each concave row 910, 912, 914 are circular in shape instead of ovals. Because of the circular shape of the keys 901, the concept of orienting the keys 901 at the first and second predetermined angles 918, 920 is not applicable to this design. However, the concept of a circumscribed oval still applies, as in the case of a central key discussed above in reference to FIG. 6. It is possible to circumscribe a thumb-impact oval onto the keys with a major axis coinciding with a line going through the center of each circular key at an angle 918 and 920 for right sided keys and left sided keys respectively. Note that the keys 901 in FIG. 8 are arranged in an offset key arrangement. In an alternative embodiment, the circular keys could be also aligned along a set of vertical references, similar to FIG. 5.

Figure 9:
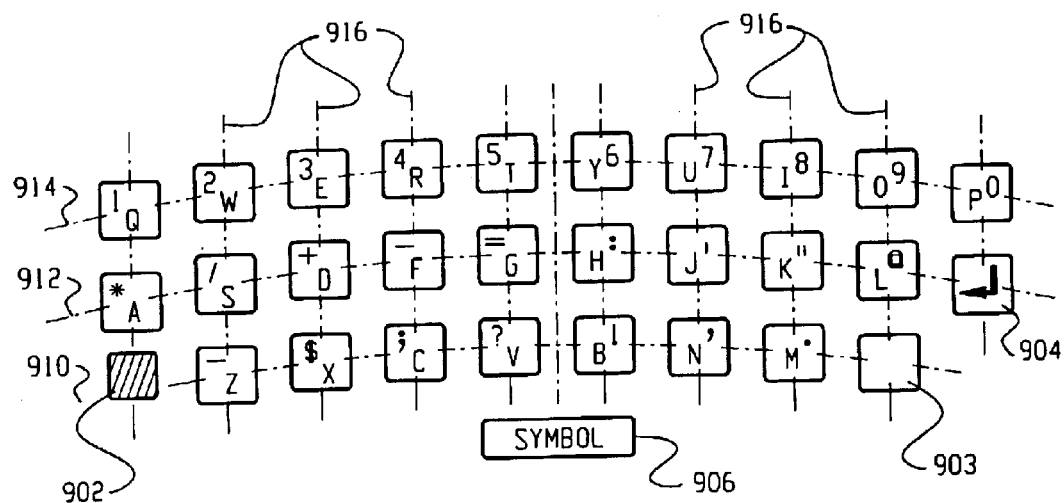
FIG. 9 shows a keyboard embodiment with square keys.

FIG. 9 shows a keyboard embodiment with square keys. This embodiment is similar to the embodiments shown in FIGS. 5 and 8, except that the keys are square instead of ovals or circles. The keys in FIG. 9 are aligned along the set of vertical references 916. In alternative embodiments, however, the square keys may instead be tilted, offset, or both.

Figure 10:
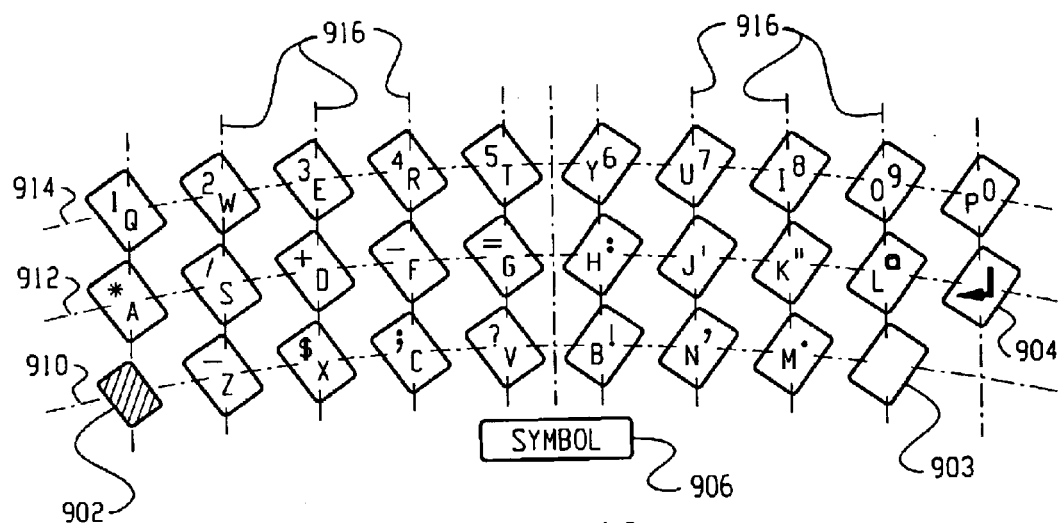
FIG. 10 shows a keyboard embodiment having rectangular keys.

FIG. 10 shows a keyboard embodiment having rectangular keys. This embodiment is similar to the embodiment shown in FIG. 9, except that the keys 901 in each concave row 910, 912, 914 are rectangular, and are slanted similar to the keys described above with reference to FIG. 5. In one alternative embodiment, the rectangular keys may be arranged in an offset layout, with a center key having a vertically symmetrical key shape and orientation that is a combination of the left key shape and the right key shape, such that the resulting shape can be used just as easily with the left or right thumb.

Figure 11C:
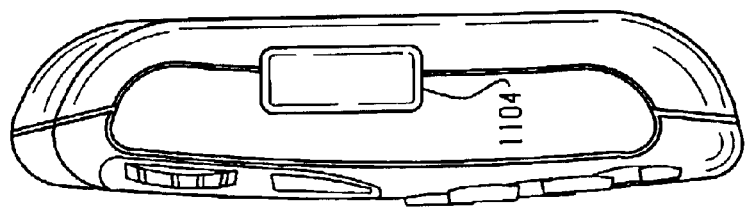
FIGS. 11a through 11c show front and side views of a hand-held electronic device incorporating an alternative functional key arrangement.
Figure 11A:
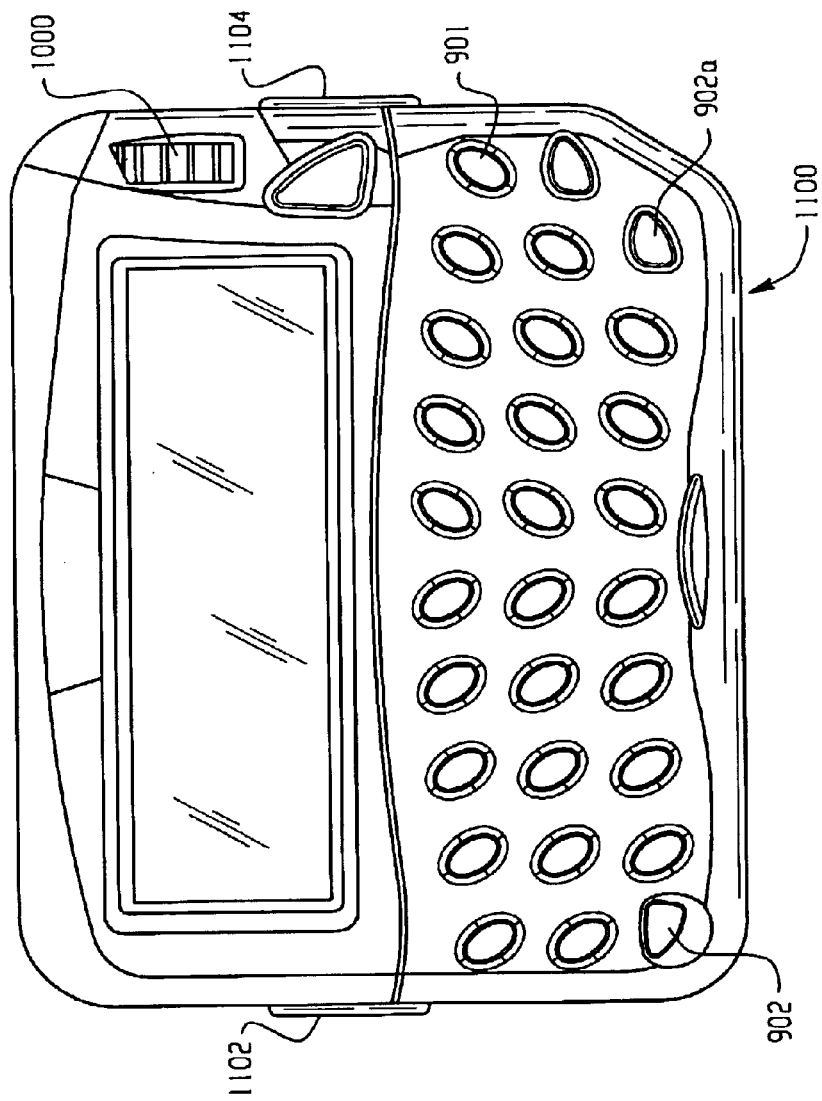
Figure 11B:
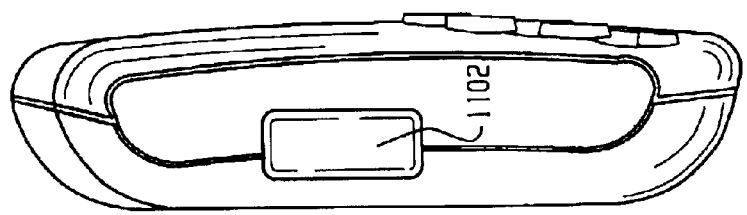

FIGS. 11*a* through 11*c* show front and side views of a hand-held electronic device incorporating an alternative functional key arrangement. As described above, a keyboard optimized for use with the thumbs may comprise keys which will normally be operated with either the right or the left thumb of a user, as well as possibly one or more keys that may be operated with either thumb. In the case of certain functional keys such as an alt key 902 or a shift key designated 902*a* in FIG. 11*a*, a device input is made when a letter key is depressed simultaneously with or subsequent to the operation of the functional key. For example, the alt key 902 may be operated in order to input a number or symbol associated with a letter key 901. In the example keyboard of FIG. 5, operation of the 'Q' key will normally cause a lowercase 'q' to be input to the device. The number '1' may be input when the 'Q' key is operated while or after the alt key 902 is operated. Similarly, an uppercase 'Q' could be entered when the 'Q' key is depressed while the shift key 902*a* is depressed or immediately after the shift key has been depressed.

Since the space that the keyboard occupies is to be minimized however, only a single alt key 902 and a single shift key 902*a* can be accommodated on a small device. Thus, a user's thumb typing may be interrupted when a letter key that is normally operated using the same thumb used to operate the alt key 902 or the shift key 902*a* is to be operated in conjunction with the alt key or shift key. According to an aspect of the invention, the device 1100 in FIG. 11*a* includes the functional keys 1102 and 1104, which are located on different surfaces of the device housing (on the sides) than the keyboard and are thus operable using other parts of the hand such as a finger or an inside part of the hand. The functional keys 1102 and 1104 may therefore easily be operated in conjunction with the depression of letter keys by the thumbs without interrupting a user's typing.

Where the key 1102 is the alt key for example, to enter the number '1' a user need simply press the functional key 1102 using a finger or part of the hand instead of a thumb and then depress the 'Q' key (see FIG. 5 for example). If the key 1104 is a shift key, then when an upper case letter is to be entered, the user may depress the key 1104 using a finger or part of the hand. Thus, the thumbs may be used only for operation of letter keys 901 and keys requiring operation of a letter key in conjunction therewith are operated using other parts of the hand. Typing speed may thereby be improved in that the entry of an upper case letter, a number, a symbol or any other special character associated with a letter key 901 does not require operation of a functional key with the thumbs.

It should be understood that, although two functional keys 1102 and 1104 are shown in FIGS. 11*a* to 11 *c*, fewer or more than two functional keys may be positioned on the device for operation with other parts of a user's hands. The number of functional keys may depend, for example, upon the particular keyboard key assignments and the relative expected frequency of use of a functional key. Where device software automatically capitalizes the first word of a sentence for example, a shift key might not be used particularly often, such that only an alt key might be provided at position 1102 or 1104. In this example and if desired, both keys 1102 and 1104 may be alt keys, such that a user may use either hand to invoke the alt function.

When a functional key is positioned for operation using another part of the hand than the thumb, the functional key need not necessarily also be provided on the keyboard, thereby reducing the space occupied by the keyboard. However, in order to provide a more familiar interface for a user, the keyboard functional keys such as 902 and 902*a* may be maintained. A user then has the option to use either the thumb-operated keyboard functional keys 902, 902*a* or the finger-or-hand-operated functional keys 1102, 1104. Alternatively, if keys 1102 and 1104 are for example alt and shift keys, then the keyboard alt and shift keys 902 and 902*a* may be assigned other functions or inputs to thereby further expand keyboard functionality.

FIGS. 12a through 12c are diagrams showing front and side views of a hand-held electronic device incorporating another alternative functional key arrangement. The device 1200 is substantially similar to the device 1100 except that functional keys 1202 and 1204 are positioned on the sides of the device housing toward the bottom of the device for operation by a part of the hand instead of the thumbs or fingers. As described above, the functional keys 1202 and 1204 may be operated by a user using a part of the hand, such as the palm of the hand or part of the hand near the base of the fingers depending upon how the user holds the device when in use, while typing on the keyboard with the thumbs. As also described above, more or fewer than the two functional keys 1202 and 1204 may be provided on the device, and the keys 1202 and 1204 may implement different functions or the same function, and may be provided instead of or in addition to the keyboard functional keys 902 and 902a.

Figure 13B:
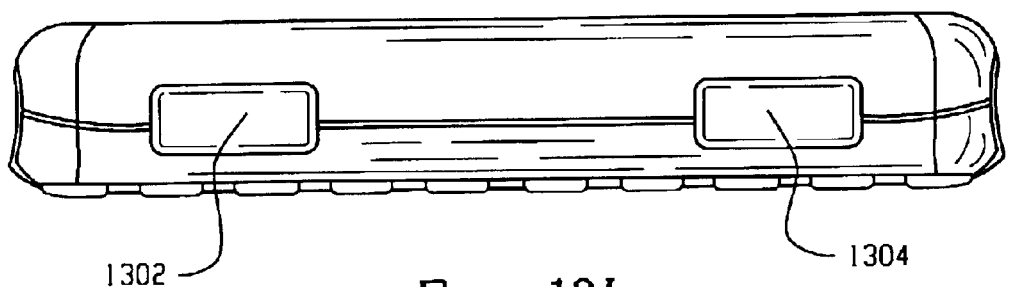
FIGS. 13a and 13b show front and top views of a hand-held electronic device incorporating a further alternative functional key arrangement.
Figure 13A:
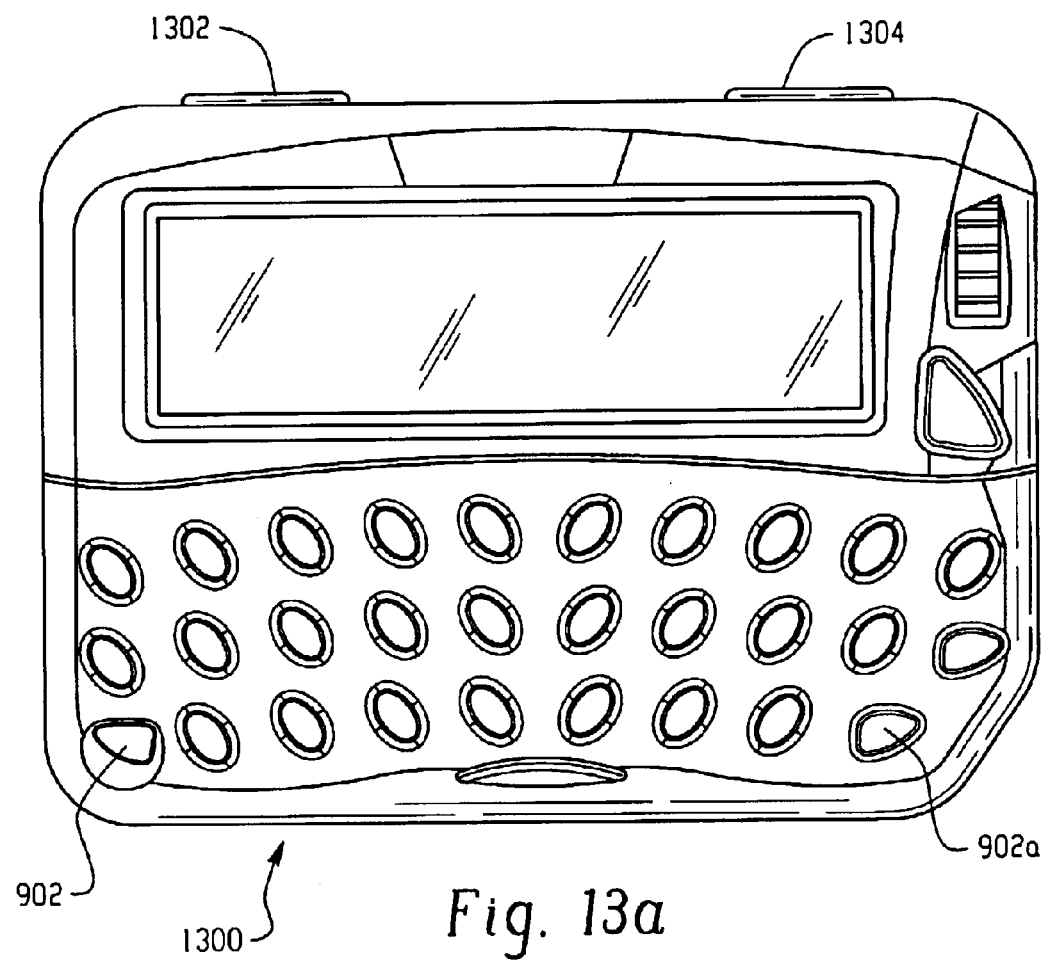

FIGS. 13a and 13b show front and top views of a hand-held electronic device incorporating a functional key arrangement according to another embodiment of the invention. In this embodiment, functional keys 1302 and 1304 are provided at the top of the housing of device 1300, for operation using the fingertips. As above, more or fewer than the two functional keys 1302, 1304 shown in FIGS. 13a and 13b may be provided in addition to or instead of keyboard functional keys 902, 902a, and such keys may be used to invoke either the same function or different functions.

Figure 14A:
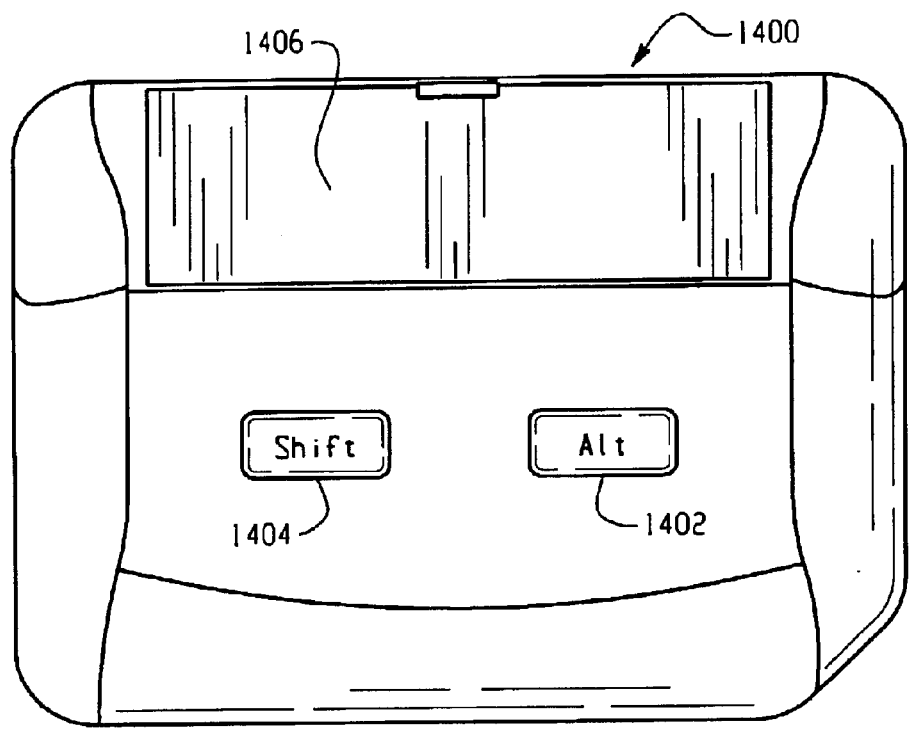
FIGS. 14a and 14b show rear views of a hand-held electronic device in which two additional functional key arrangements are implemented.
Figure 14B:
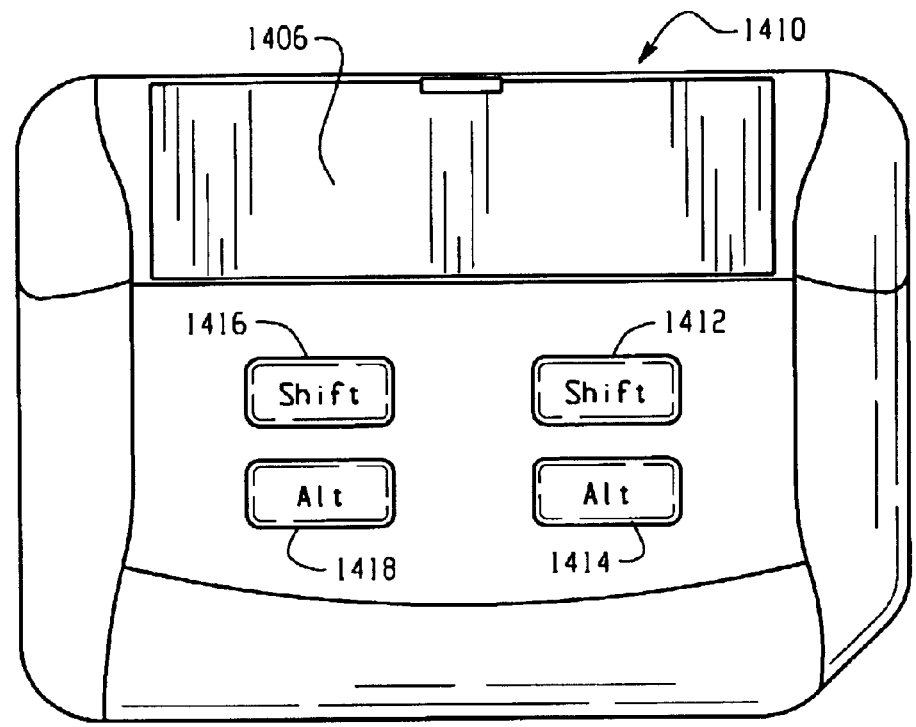

FIGS. 14a and 14b show rear views of a hand-held electronic device in which respective functional key arrangements are implemented. In FIG. 14a, two functional keys are shown: an alt key 1402 and a shift key 1404. These particular functional keys are labeled for illustrative purposes only and as such are not intended to limit the scope of the invention. Other functions may also or instead be associated with the functional keys 1402 and 1404. The keys 1402 and 1404 are preferably located so as not to interfere with any removable device elements such as a removable housing section 1406 which may, for example, cover a battery compartment. Rear-mounted keys are also preferably positioned to provide ample space for a user to hold the device without contacting the functional keys 1402, 1404.

In the FIG. 14a arrangement, the alt key 1402 is positioned for operation with a finger of the left hand of the user, whereas the shift key 1404 is positioned for operation with a finger of the right hand. Where a user is familiar with a keyboard layout as shown in FIG. 2 for example, although the keys 1402, 1404 are hidden from view when a device 1400 is in use, the associations between a left hand alt operation and a right hand shift operation are maintained. However, the invention is in no way restricted to this specific key designation and relative positioning.

One alternative functional key arrangement is shown in FIG. 14b, wherein a shift key and an alt key are provided for operation with the fingers of each hand. The shift and alt key pair 1412, 1414 would be operable using one or more fingers of the left hand, and the pair 1416, 1418 are operable using fingers of the right hand. Although four separate keys are shown in FIG. 14b, two centrally positioned and possibly elongated keys accessible to the fingers of both hands when a device 1410 is in use could replace the four key arrangement. With either of these arrangements, the relative shift/alt key positioning, i.e., a shift key above the alt key and both keys operable using either hand, will be familiar to users of a PC keyboard.

It should be understood that the above functional key embodiments are not mutually exclusive. A hand-held electronic device may possibly be provided with functional keys on its sides, top, back or any combination thereof. A user may then have the option of using whichever function key set he or she finds easiest to use. It is also contemplated that devices may incorporate different functional key arrangements or combinations thereof, allowing a user to choose a particular functional key arrangement when a device is purchased.

FIGS. 15a to 15c show front and side views of an alternate hand-held electronic device incorporating embodiments of the invention. The device 1500 may be similar to the devices 1100, 1200, 1300, 1400 and 1410 except that its display screen 1501 is substantially larger and its keyboard is somewhat different. Provided that a device keyboard includes at least one functional key 902 or functional keys are desired in order to expand functionality of a device keyboard without adding keyboard keys, then the present invention may be particularly advantageous. In FIGS. 15a to 15c, the functional keys may be positioned, for example, as shown at 1502, 1504, 1506, 1508, 1510, 1512, or possibly at more than one such location, for operation using the fingers or part of the hand substantially as described above.

Figure 16:
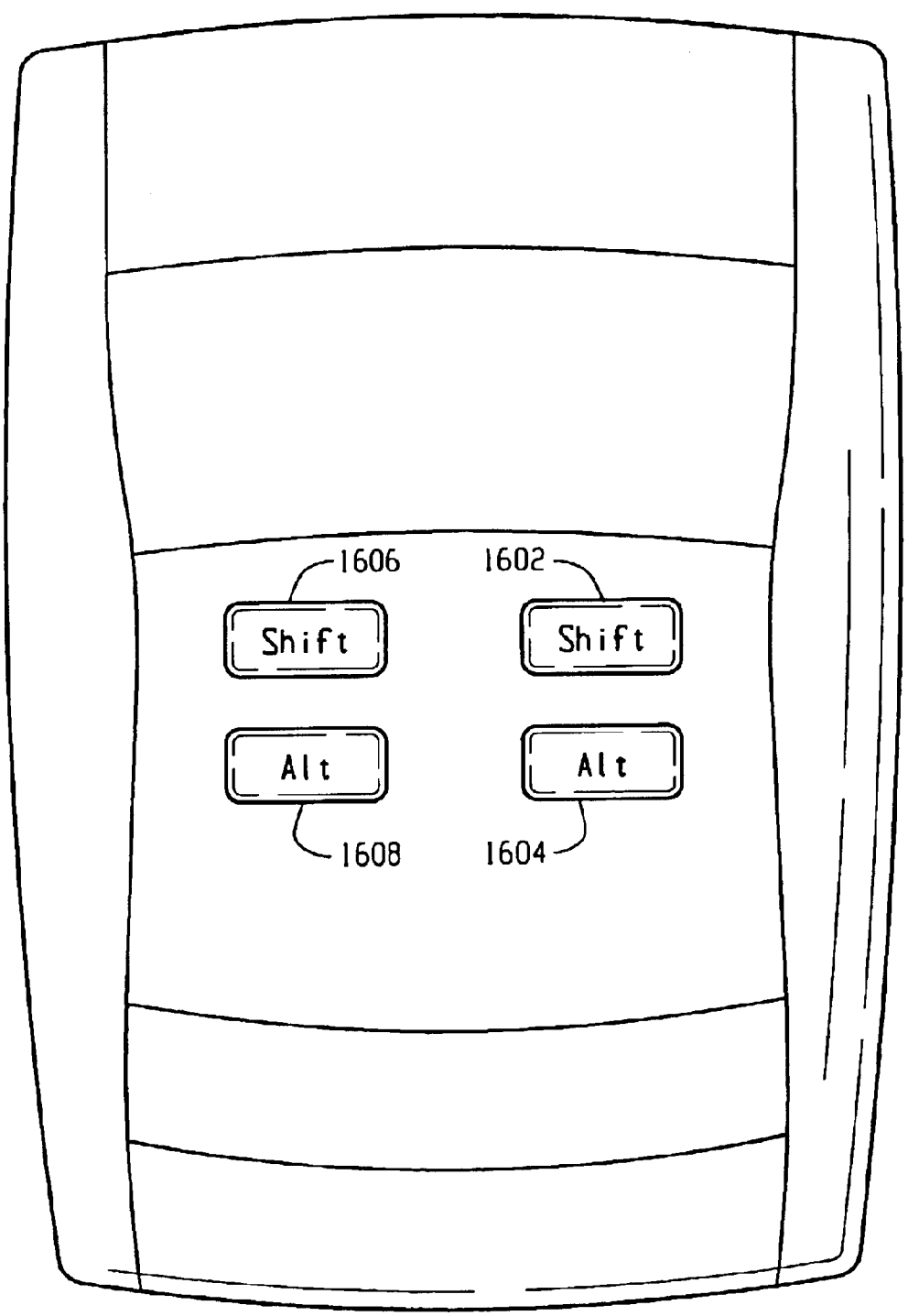
FIG. 16 is a rear view of a device, such as shown in FIG. 15, in which another functional key arrangement is implemented.
Figure 17D:
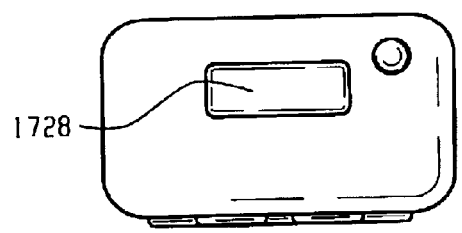
FIGS. 17a through 17d show front, side and top views of a further exemplary hand-held electronic device incorporating alternative functional key arrangements.
Figures 17A, 17B, 17C:
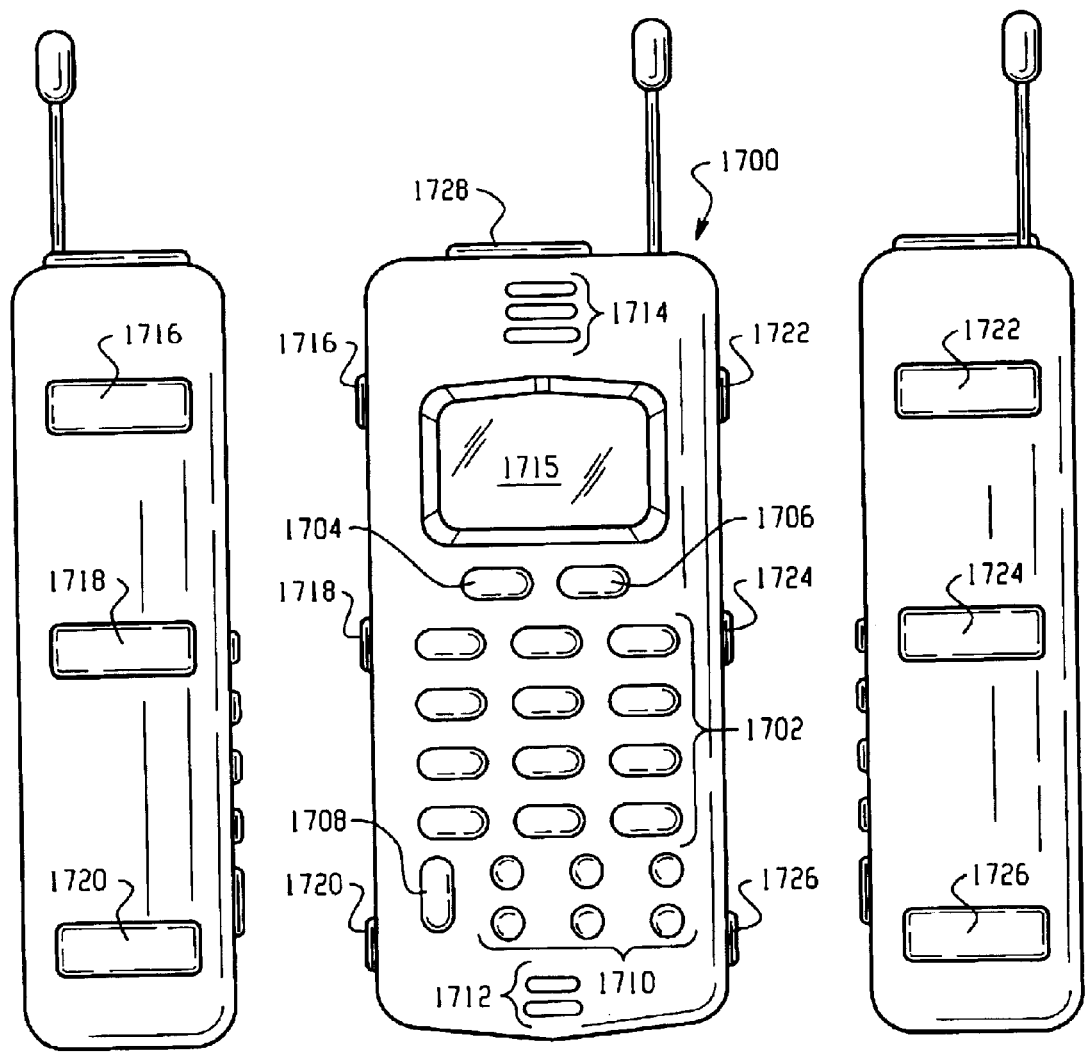

FIG. 16 is a rear view of a device, such as shown in FIG. 15, in which a functional key arrangement according to a further embodiment of the invention is implemented. As shown in FIG. 16, functional keys such as shift keys 1602, 1606 and alt keys 1604 and 1608 may be positioned at locations on a rear device housing so as to be accessible to a user's fingers while providing sufficient space for a user to hold the device without contacting the functional keys and not interfering with any removable device housing sections or other internal or external device components.

Depending upon the size of the device 1500, a user might not be able to use top-mounted keys such as shown in FIGS. 13a and 13b while thumb typing on the keyboard. Side-and back-mounted functional keys as shown in FIGS. 15a to 15c and 16 are therefore more suited to devices having larger form factors than top-mounted keys. It should be understood, however, that whenever device physical dimensions permit, top-mounted functional keys may be implemented.

Although the devices shown in FIGS. 11a–c, 12a–c, 13a–b and 15a–c include slanted oval-shaped keyboard keys, the functional keys and arrangements disclosed herein are in no way restricted to this type of keyboard key shape or layout. The invention may be implemented in conjunction with any of the keyboards described above, including those shown in FIGS. 2 and 5–10 for example, as well as virtually any other hand-held electronic device keyboard.

Similarly, the present invention is not restricted to devices having a "full" keyboard. FIGS. 17a to 17d show front, side and top views of a further alternative hand-held electronic device incorporating functional key arrangements according to embodiments of the invention. The device shown in FIGS. 17a–17d is a mobile telephone 1700, having a standard numeric keypad 1702 and a plurality of additional keys 1704, 1706, 1708 and 1710, which may include, for example, a power key, a send key, an end key, and like keys typically found on mobile telephones. Mobile telephone users normally operate such keys using the thumb of one hand while holding the telephone. The device 1700 also includes a microphone 1712, a speaker 1714 and a display screen 1715. In accordance with the invention, one or more of the functional keys 1716, 1718, 1820, 1722, 1724, 1726 and 1728 are implemented in the device 1700. It should be understood that mobile telephones are available in many different forms and sizes, and that the present invention is applicable to virtually any design. For example, a device 1700 may have a "slim" form factor, wherein its side profile or depth dimension is significantly smaller than its front/back profile or width, or comprise a clamshell design with hinged sections. Any functional keys 1716–1728 could then be sized and positioned accordingly.

When used only to enter numbers, a keypad 1702 is normally sufficient. However, text entry via the keypad is often required, and is becoming much more common with the increasing popularity of Short Message Service (SMS) and other text-or data-related functions that mobile telephones may support. Although numeric keypad keys also have associated text characters, known text entry schemes involving multiple depressions of a single key for example tend to be slow, even when used in conjunction with predictive automatic text techniques. Therefore, one contemplated function for a functional key is to select between numeric and text entry when a keypad key is depressed. For example, if a user wishes to enter the letter 'A', normally associated with the number key '2' on standard telephone keypads, the user could depress a function key, 1716 for example, and simultaneously depress the '2' key. The functional key 1716 may be held in its depressed position as long as text entry is required. When the key 1716 is released, the keypad then preferably reverts back to a numeric entry state. Alternatively, a single depression of the functional key 1716 may toggle the keypad between numeric and text entry states. Such functionality may provide for much faster and easier text entry on a substantially thumb-operated numeric keypad.

Where more than one functional key is provided on the device 1700, text entry may be further facilitated by allowing a user to select between the multiple characters associated with a keypad key. In a device 1700 with four keys for example, any particular letter associated with any keypad key might be selected using the function keys. Operation of a first functional key in conjunction with a '7' key on a conventional keypad might select a first text character 'P', whereas second, third and fourth functional keys may be used to respectively select 'Q', 'R' and 'S'. As described above, any functional key and keypad key could preferably be operated simultaneously, using a finger or part of the hand to operate a functional key while using a thumb to depress a keypad key.

It should be understood that the above text entry function is merely an illustrative example of a possible implementation of an embodiment of the invention. Other functions allowing expansion of keypad key functionality through the use of finger-or-hand-operated functional keys are also within the scope of the present invention.

As described above for the preceding keypad arrangements, the functional keys 1716–1728 may provide the same or different functions. In devices such as device 1700 which are normally held on one hand, duplication of functional keys on each side of the device may be particularly advantageous in that the device may be used with either a left hand or a right hand. The left-hand side functional keys 1716–1720 would be operable using fingers on the right hand, left-hand side functional keys 1722–1726 would be operable using fingers on the left hand, and the top functional key 1728 would be accessible by either hand.

In one alternative embodiment the functional keys shown in FIGS. 17*a–d* may also or instead be provided on the rear of device 1700.

This written description uses examples to disclose the invention, including the best mode, and also to enable any person skilled in the art to make and use the invention. The patentable scope of the invention is defined by the claims, and may include other examples that occur to those skilled in the art.

For example, the functional keys have been shown in the drawings as rectangular keys. Implementation of functional keys having other shapes intended to improve key operability or esthetic appeal of a device are also contemplated. Functional keys on the same device might also have different shapes adapted to the part of the fingers or hands by which the keys will be operated or to allow a user to distinguish between different functional keys. Similarly, although the functional keys have been shown in the drawings as projecting beyond the device housing, the keys may instead be substantially flush with or recessed below the device housing surface in order to prevent inadvertent operation thereof.

In addition, the alt and shift functional keys are shown in some of the drawings for illustrative purposes only. Other functional keys that are normally operated in conjunction with other letter keys, such as a control (ctrl) keyboard key, may also or instead be implemented in accordance with the invention.

We claim:

1. A hand-held messaging device, comprising:
   a miniaturized QWERTY style keyboard that is horizontally positioned symmetrically between a left edge and a right edge of a face of the hand-held messaging device and having a plurality of keys arranged in three rows across the face, wherein each row of keys is arranged in a concave pattern and wherein each of the plurality of keys is aligned along a vertical axis with a key from an adjacent row of keys, the vertical axis extending perpendicularly from a top edge to a bottom edge of the hand-held messaging device;
   a display that is vertically positioned between the keyboard and a top edge of the face and horizontally positioned symmetrically between the left edge and the right edge of the face; and
   a processor coupled to the keyboard and the display that controls the operation of the hand-held messaging device;
   wherein keys that are aligned along a vertical axis are aligned with substantially no vertical offset.

2. The hand-held messaging device of claim 1, wherein the hand-held messaging device includes a plurality of connecting surfaces for connecting the face to a bottom surface, and further comprising:
   at least one functional key positioned on the connecting surfaces of the hand-held messaging device.

3. The hand-held messaging device of claim 2, wherein the functional key is an alt key.

4. The hand-held messaging device of claim 2, wherein the functional key is a capitalization key.

5. The hand-held messaging device of claim 1, wherein the hand-held messaging device includes a plurality of connecting surfaces for connecting the face to a bottom surface, and further comprising:
   at least one functional key positioned on the bottom surface of the hand-held messaging device.

6. The hand-held messaging device of claim 5, wherein the functional key is an alt key.

7. The hand-held messaging device of claim 5, wherein the functional key is a shift key.

8. The hand-held messaging device of claim 1, wherein the hand-held messaging device includes a plurality of connecting surfaces for connecting the face to a bottom surface, and further comprising:

at least one type of functional key, wherein two of each type of functional key are positioned on the bottom surface of the hand-held messaging device.

9. The hand-held messaging device of claim 8, wherein the two functional keys of each type include a first functional key that is positioned for use with a left hand of a user and a second functional key that is positioned for use with a right hand of the user.

10. The hand-held messaging device of claim 1, wherein the hand-held messaging device includes a plurality of connecting surfaces for connecting the face to a bottom surface, and further comprising:

at least one type of functional key, wherein two of each type of functional key are positioned on two of the connecting surfaces, respectively.

11. The hand-held messaging device of claim 10, wherein the two functional keys of each type include a first functional key that is positioned for use with a left hand of a user and a second functional key that is positioned for use with a right hand of a user.

12. The hand-held messaging device of claim 1, wherein the hand-held messaging device includes a plurality of connecting surfaces for connecting the face to a bottom surface, and further comprising:

at least one type of functional key, wherein two of each type of functional key are positioned on one of the connecting surfaces.

13. The hand-held messaging device of claim 12, wherein the two functional keys of each type include a first functional key that is positioned for use with a left hand of a user and a second functional key that is positioned for use with a right hand of user.

14. The hand-held messaging device of claim 1, wherein each row of keys is arranged in a concave-up pattern.

15. The hand-held messaging device of claim 1, wherein each row of keys is arranged in a concave-down pattern.

16. The hand-held messaging device of claim 1, wherein each row of keys is arranged along an arc.

17. The hand-held messaging device of claim 1, wherein each row of keys is arranged along two intersecting line segments.

18. The hand-held messaging device of claim 1, wherein at least one of the plurality of keys of the keyboard is oblong.

19. The hand-held messaging device of claim 18, wherein the oblong key is tilted at an angle from a vertical axis extending through a center of the key.

20. The hand-held messaging device of claim 18, wherein the oblong key is aligned with a vertical axis extending through a center of the key.

21. The hand-held messaging device of claim 1, wherein the plurality of keys of the keyboard are oblong.

22. The hand-held messaging device of claim 21, wherein a first portion of the oblong keys are tilted at a negative angle from vertical and a second portion of the oblong keys are tilted at a positive angle from vertical.

23. The hand-held messaging device of claim 21, wherein the oblong keys are all tilted at the same or substantially the same angle from vertical.

24. The hand-held messaging device of claim 1, wherein at least one of the plurality of keys of the keyboard is oval.

25. The hand-held messaging device of claim 24, wherein the oval key is tilted at an angle from a vertical axis extending through a center of the key.

26. The hand-held messaging device of claim 24, wherein the oval key is aligned with a vertical axis extending through a center of the key.

27. The hand-held messaging device of claim 1, wherein at least one of the plurality of keys of the keyboard is circular.

28. The hand-held messaging device of claim 1, wherein at least one of the plurality of keys of the keyboard is rectangular.

29. The hand-held messaging device of claim 28, wherein the rectangular key is tilted at an angle from a vertical axis extending through a center of the key.

30. The hand-held messaging device of claim 28, wherein the rectangular key is aligned with a vertical axis extending through a center of the key.

31. The hand-held messaging device of claim 1, wherein the plurality of keys each have a shape that is contoured for optimal typing with a user's thumbs.

32. The hand-held messaging device of claim 1, wherein the keyboard includes:

a first row of keys having ten (10) keys, wherein a first set of five (5) keys from the first row are arranged in a pattern having a positive slope from vertical and a second set of five (5) keys from the first row are arranged in a pattern having a negative slope from vertical;

a second row of keys having nine (9) keys, wherein a first set of four (4) keys from the second row are arranged in a pattern having a positive slope from vertical, a second set of four (4) keys from the second row are arranged in a pattern having a negative slope from vertical, and a center key from the second row is positioned equidistant or substantially equidistant from the left edge and the right edge of the face; and a third row of keys having at least eight keys, wherein a first set of four (4) keys from the third row is arranged in a pattern having a positive slope from vertical and a second set of four (4) keys from the third row is arranged in a pattern having a negative slope from vertical.

33. The hand-held messaging device of claim 32, wherein one of the keys from the third row is a line feed key.

34. The hand-held messaging device of claim 1, wherein the keyboard includes three (3) rows of keys, wherein each of the three rows of keys includes a first set of five (5) keys that are arranged in a pattern having a positive slope from vertical and a second set of five (5) keys that are arranged in a pattern having a negative slope from vertical.

35. The hand-held messaging device of claim 1, wherein the keyboard includes twenty-six (26) letter keys.

36. The hand-held messaging device of claim 35, wherein the twenty-six (26) letter keys are arranged in the format of a QWERTY-style keyboard.

37. The hand-held messaging device of claim 36, further comprising:

a row of functional keys that are horizontally positioned symmetrically or substantially symmetrically between a left edge and a right edge of the face of the hand-held messaging device and vertically positioned between the keyboard and a bottom edge of the hand-held messaging device.

38. The hand-held messaging device of claim 37, wherein the row of functional keys includes a space bar.

39. The hand-held messaging device of claim 37, wherein the row of functional keys includes a an alt key, and wherein at least one letter key has an associated alternate character that may be input to the processor by simultaneously depressing the letter key and the alt key.

40. The hand-held messaging device of claim 37, wherein the row of functional keys includes a shift key.

41. The hand-held messaging device of claim 37, wherein the row of functional keys includes a menu key.

42. The hand-held messaging device of claim 37, further comprising:
at least one additional functional key positioned below the row of functional keys.

43. The hand-held messaging device of claim 42, wherein the additional functional key is a scroll-up key.

44. The hand-held messaging device of claim 42, wherein the additional functional key is a scroll-down key.

45. The hand-held messaging device of claim 42, wherein the additional functional key launches an application program.

46. The hand-held messaging device of claim 1, further comprising:
at least one additional functional key positioned above the keyboard.

47. The hand-held messaging device of claim 46, wherein the additional functional key is a backspace key.

48. The hand-held messaging device of claim 46, wherein the additional functional key is a home key.

49. The hand-held messaging device of claim 46, wherein the additional functional key is an escape key.

50. The hand-held messaging device of claim 46, wherein the additional functional key is a menu key.

51. The hand-held messaging device of claim 46, wherein the additional functional key is a delete key.

52. The hand-held messaging device of claim 46, wherein the additional functional key is a cursor-left key.

53. The hand-held messaging device of claim 46, wherein the additional functional key is a cursor-right key.

54. The hand-held messaging device of claim 1, further comprising:
a thumb-wheel coupled to the processor, wherein the thumb-wheel is vertically positioned on the face of the hand-held messaging device above the keyboard and below the display.

55. The hand-held messaging device of claim 1, wherein the thumb-wheel is horizontally positioned symmetrically or substantially symmetrically between the left edge and the right edge of the face such that the thumb-wheel may be operated by a user with either a right hand or a left hand.

56. The hand-held messaging device of claim 1, further comprising:
a thumb-wheel coupled to the processor, wherein the thumb-wheel is positioned on a side surface of the hand-held messaging device.

57. The hand-held messaging device of claim 1, further comprising:
a rocker switch coupled to the processor, wherein the rocker switch is positioned on a side surface of the hand-held messaging device.

58. The hand-held messaging device of claim 1, further comprising:
a wireless radio subsystem coupled to the processor that transmits and receives electronic messages from a wireless network; and
a memory device coupled to the processor that stores electronic messages received from the wireless network.

59. The hand-held messaging device of claim 58, further comprising:
application software executing on the processor, wherein the application software includes an electronic messaging application that receives electronic messages that are wirelessly redirected to the hand-held messaging device from a redirection software application executing on a corporate server.

60. The hand-held messaging device of claim 59, wherein the application software includes a calendar application.

61. The hand-held messaging device of claim 1, further comprising:
a rechargeable battery coupled to the processor that supplies power to the hand-held messaging device.

62. The hand-held messaging device of claim 1, further comprising:
a light source positioned to provide light to the keyboard.

63. The hand-held messaging device of claim 62, wherein the light source also provides light to the display.

64. The hand-held messaging device of claim 62, wherein the light source is a backlight mounted within a housing of the hand-held messaging device.

65. A hand-held messaging device, comprising:
a device housing having a face, a bottom surface, and a plurality of connecting surfaces for connecting the face to the bottom surface;
a display mounted within the face of the device housing and horizontally positioned symmetrically between a left edge of face and a right edge of the face;
a miniaturized keyboard mounted within the face of the device housing in a position between the display and a bottom edge of the face, wherein the keyboard comprises a QWERTY-stile keyboard having a plurality of keys arranged in three rows across the face, wherein each row of keys is arranged in a concave pattern and is distributed symmetrically across the face of the housing, wherein the keyboard includes a plurality of letter keys and at least one specialized key and wherein each of the plurality of keys is aligned along a vertical axis with a key from an adjacent row of keys, the vertical axis extending perpendicularly from a top edge to the bottom edge of the face of the device housing; and
an auxiliary input device mounted within the housing;
wherein keys that are aligned along a vertical axis are aligned with substantially no vertical offset.

66. The hand-held messaging device of claim 65, further comprising:
at least one functional key mounted within the connecting surfaces of the device.

67. The hand-held messaging device of claim 65, further comprising:
at least one functional key mounted within the bottom surface of the device.

68. The hand-held messaging device of claim 65, wherein each row of keys is arranged in a concave-up pattern.

69. The hand-held messaging device of claim 65, wherein each row of keys is arranged in a concave-down pattern.

70. The hand-held messaging device of claim 65, wherein each row of keys is arranged along an arc.

71. The hand-held messaging device of claim 65, wherein each row of keys is arranged along two intersecting line segments.

72. The hand-held messaging device of claim 65, wherein the plurality of keys are oblong.

73. The hand-held messaging device of claim 72, wherein the oblong shaped keys are tilted with respect to a vertical reference through the face of the device housing.

74. The hand-held messaging device of claim 72, wherein the oblong shaped keys are aligned with a vertical reference through the face of the device housing.

75. The hand-held messaging device of claim 72, wherein the oblong shaped keys are oval shaped.

76. The hand-held messaging device of claim 65, wherein the plurality of keys are circular.

77. The hand-held messaging device of claim 65, wherein the plurality of keys are square.

78. The hand-held messaging device of claim 65, wherein the plurality of keys are rectangular.

79. The hand-held messaging device of claim 65, wherein the specialized key is a line feed key.

80. The hand-held messaging device of claim 65, wherein the specialized key is a backspace key.

81. The hand-held messaging device of claim 65, wherein the keyboard further comprises a row of functional keys.

82. The hand-held messaging device of claim 65, wherein the row of functional keys includes at least a space bar key, an alt key, and a shift key.

83. The hand-held messaging device of claim 81, wherein the row of functional keys includes at least a space bar key, a shift key, and a menu key.

84. The hand-held messaging device of claim 65, wherein the hand-held device is a two-way pager, a personal digital assistant or an electronic organizer.

85. The hand-held messaging device of claim 65, wherein the display occupies more than half of the surface area of the face of the device.

86. The hand-held messaging device of claim 65, wherein the auxiliary input device is mounted within one of the connecting surfaces.

87. The hand-held messaging device of claim 65, wherein the auxiliary input device is a thumbwheel.

88. The hand-held messaging device of claim 65, wherein the auxiliary input device is a rocker switch.

89. The hand-held messaging device of claim 65, wherein the auxiliary input device includes a directional input component for navigating a plurality of menu items presented on the display and a selector switch for selecting a menu item from the plurality of menu items.

90. The hand-held messaging device of claim 65, wherein the auxiliary input device is mounted within the face of the device.

91. The hand-held messaging device of claim 65, further comprising:
a transceiver for transmitting and receiving messages.

92. The hand-held messaging device of claim 91, further comprising:
a first antenna for receiving messages; and
a second antenna for transmitting messages.

93. The hand-held messaging device of claim 92, wherein the transceiver further comprises:
a receiver, coupled to the first antenna, for demodulating the received messages; and
a transmitter, coupled to the second antenna, for generating a modulated message.

94. The hand-held messaging device of claim 93, wherein the transceiver further comprises:
a digital signal processor coupled to the transmitter and the receiver for processing demodulated messages from the receiver, and for providing modulation information to the transmitter.

95. The hand-held messaging device of claim 65, wherein the keyboard includes a backlight.

96. A wireless e-mail device, comprising:
a device housing having a face and a left and right side surface coupled to the face; display mourned within the face;
a transceiver for receiving e-mail messages from a wireless network and for transmitting e-mail messages generated on the wireless e-mail device to the wireless network; and
a miniaturized QWERTY style keyboard that is horizontally positioned symmetrically between the left side surface and the right side surface and having a plurality of keys arranged in three rows across the face, wherein each row of keys is arranged in a concave pattern and wherein each of the plurality of keys is aligned along a vertical axis with a key from an adjacent row of keys, the vertical axis extending perpendicularly from a top edge to a bottom edge of the face of the device housing;
wherein keys that are aligned along a vertical axis are aligned with substantially no vertical offset.

97. The wireless e-mail device of claim 96, further comprising:
at least one functional key positioned on the left side surface of the device.

98. The wireless e-mail device of claim 96, further comprising:
at least one functional key positioned on the right side surface of the device.

99. The wireless e-mail device of claim 96, further comprising:
at least one type of functional key, wherein the one type of functional key is positioned on both the left and right side surfaces of the device.

100. The wireless e-mail device of claim 96, wherein the device housing includes a bottom surface coupled to the left and right side surfaces, and further comprising:
at least one functional key positioned on the bottom surface of the housing.

101. The wireless e-mail device of claim 96, wherein the device housing includes a top side surface coupled to the face, and further comprising:
at least one functional key positioned on the top side surface.

102. The wireless e-mail device of claim 96, further comprising an auxiliary input device mounted within the device housing.

103. The wireless e-mail device of claim 102, wherein the auxiliary input device is a thumbwheel.

104. The wireless e-mail device of claim 102, wherein the auxiliary input device is a rocker switch.

105. The wireless e-mail device of claim 102, wherein the auxiliary input device includes a directional input component for navigating a plurality of menu items presented on the display and a selector switch for selecting a menu item from the plurality of menu items.

106. The wireless e-mail device of claim 96, further comprising an antenna coupled to the transceiver.

107. The wireless e-mail device of claim 96, further comprising:
a microprocessor; and
a memory for storing an operating system and a plurality of application programs that are executed by the microprocessor to control the operation of the wireless e-mail device.

108. The wireless e-mail device of claim 107, further comprising a digital signal processor coupled between the microprocessor and the transceiver.

109. The wireless e-mail device of claim 107, wherein the plurality of application programs include a messaging application for generating e-mail messages and a calendar application.

110. The wireless e-mail device of claim 109, wherein the plurality of application programs further include an address book application.

111. The wireless e-mail device of claim 107, wherein the memory is a flash memory.

112. The wireless e-mail device of claim 96, further comprising a serial port for coupling the wireless e-mail device to a host computer.

113. The wireless e-mail device of claim 96, further comprising a power supply system including a rechargeable battery and an external charger input for receiving a source of electrical charge to recharge the rechargeable battery.

114. The wireless e-mail device of claim 113, wherein the rechargeable battery is a lithium battery.

115. The wireless e-mail device of claim 113, wherein the power supply subsystem further includes a voltage regulator coupled to the rechargeable battery for generating a regulated supply voltage for powering the device.

116. The wireless e-mail device of claim 113, wherein the power supply subsystem further includes connections to a microprocessor for monitoring the operation of the power supply subsystem.

117. A hand-held messaging device, comprising:
a device housing having a face;
a display mounted within the face;
a miniaturized keyboard mounted within the face of the device housing in a position between the display and a bottom edge of the face, wherein the keyboard comprises a QWERTY-style keyboard having a plurality of keys arranged in three rows across the face, wherein each row of keys is arranged in a concave pattern and is distributed symmetrically across the face of the housing, wherein the keyboard includes a plurality of letter keys and at least one specialized key and wherein each of the plurality of keys is aligned along a vertical axis with a key front an adjacent row of keys, the vertical axis extending perpendicularly from a top edge to the bottom edge of the face; and
means for receiving e-mail messages from a wireless network and for transmitting e-mail messages generated on the hand-held messaging device to the wireless network;
wherein keys that are aligned along a vertical axis are aligned with substantially no vertical offset.

118. The hand-held messaging device of claim 117, wherein the device housing includes a left side surface and a right side surface, and further comprising:
at least one functional key positioned on the left side surface of the device.

119. The hand-held messaging device of claim 117, wherein the device housing includes a left side surface and a right side surface, and further comprising:
at least one functional key positioned on the right side surface of the device.

120. The hand-held messaging device of claim 117, wherein the device housing includes a left side surface and a right side surface, and further comprising:
at least one type of functional key, wherein the one type of functional key is positioned on both the left and right side surfaces of the device.

121. The hand-held messaging device of claim 117, wherein the device housing includes a bottom surface coupled to the left and right side surfaces, and further comprising:
at least one functional key positioned on the bottom surface of the housing.

122. The hand-held messaging device of claim 117, wherein the device housing includes a top side surface coupled to the face, and further comprising:
at least one functional key positioned on the top side surface.

123. A hand-held messaging device, comprising:
a device housing having a face;
a display mounted within the face;
a miniaturized keyboard mourned within the face of the device housing in a position between the display and a bottom edge of the face, wherein the keyboard comprises a QWERTY-style keyboard having a plurality of keys arranged in three rows across the face, wherein each row of keys is arranged in a concave pattern and is distributed symmetrically across the face of the housing, wherein the keyboard includes a plurality of letter keys and at least one specialized key and wherein each of the plurality of keys is aligned along a vertical axis with a key from an adjacent row of keys, the vertical axis extending perpendicularly from a top edge to the bottom edge of the face;
an auxiliary input device mounted within the device housing; a transceiver for receiving information from a wireless network and for transmitting information to the wireless network;
an antenna coupled to the transceiver
a microprocessor;
a memory for storing an operating system and a plurality of application programs that are executed by the microprocessor to control the operation of the hand-held messaging device; and a power supply system including a rechargeable battery and an external charger input for receiving a source of electrical charge to recharge die rechargeable battery;
wherein keys that arc aligned along a vertical axis are aligned with substantially no vertical offset.

124. The hand-held messaging device of claim 123, wherein the device housing includes a left side surface and a right side surface, and further comprising:
at least one functional key positioned on the left side surface of the device.

125. The hand-held messaging device of claim 123, wherein the device housing includes a left side surface and a right side surface, and further comprising:
at least one functional key positioned on the right side surface of the device.

126. The hand-held messaging device of claim 123, wherein the device housing includes a left side surface and a right side surface, and further comprising:
at least one type of functional key, wherein the one type of functional key is positioned on both the left and right side surfaces of the device.

127. The hand-held messaging device of claim 123, wherein the device housing includes a bottom surface coupled to the left and right side surfaces, and further comprising:
at least one functional key positioned on the bottom surface of the housing.

128. The hand-held messaging device of claim 123, wherein the device housing includes a top side surface coupled to the face, and further comprising:
at least one functional key positioned on the top side surface.

* * * * *